(12) United States Patent
Kojima et al.

(10) Patent No.: US 9,699,106 B2
(45) Date of Patent: Jul. 4, 2017

(54) LINK AGGREGATION APPARATUS AND METHOD FOR DISTRIBUTING A TCP FLOW TO MULTIPLE LINKS

(71) Applicant: FUJITSU LIMITED, Kawasaki-shi, Kanagawa (JP)

(72) Inventors: Yuji Kojima, Kawasaki (JP); Junichi Suga, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 234 days.

(21) Appl. No.: 14/614,933

(22) Filed: Feb. 5, 2015

(65) Prior Publication Data

US 2015/0281997 A1 Oct. 1, 2015

(30) Foreign Application Priority Data

Mar. 28, 2014 (JP) ................................ 2014-070342
Oct. 27, 2014 (JP) ................................ 2014-218542

(51) Int. Cl.
*H04J 1/16* (2006.01)
*H04L 12/891* (2013.01)
*H04L 12/801* (2013.01)

(52) U.S. Cl.
CPC ............ *H04L 47/41* (2013.01); *H04L 47/193* (2013.01); *H04L 47/34* (2013.01); *Y02B 60/33* (2013.01)

(58) Field of Classification Search
CPC ....... H04L 47/41; H04L 47/193; H04L 47/34; Y02B 60/33

(Continued)

(56) References Cited

U.S. PATENT DOCUMENTS

| 6,272,148 B1 | 8/2001 | Takagi et al. | |
|---|---|---|---|
| 2005/0068894 A1* | 3/2005 | Yu | H04L 29/06 370/235 |

(Continued)

FOREIGN PATENT DOCUMENTS

| JP | 11-163947 A | 6/1999 |
|---|---|---|
| JP | 2006-074104 A | 3/2006 |

(Continued)

OTHER PUBLICATIONS

Yohei et al., "A Multi-path TCP Gateway with Dynamic Path-Load-Balancing", The Institute of Electronics, Information and Communication Engineers, Technical Report of IEICE, NS2003-328, IN2003-283(Mar. 2004), pp. 175 to 178, Mar. 2004.

*Primary Examiner* — Peter Cheng
(74) *Attorney, Agent, or Firm* — Arent Fox LLP

(57) ABSTRACT

An apparatus performs link aggregation for distributing a transmission control protocol (TCP) flow to multiple links. The apparatus includes multiple TCP processing units each corresponding to a different one of the multiple links, and distributes TCP packets transmitted from a first apparatus on a transmission side to the multiple links. Each TCP processing unit provides each of TCP packets distributed to the each link with an intra-link number. The apparatus manages, for each TCP packet distributed to each link, correspondence relationships between intra-flow numbers assigned in each TCP flow and the intra-link numbers of the TCP packets distributed to the each link, replaces a first reception-acknowledgement response which is transmitted from a second apparatus on a reception side according to the intra-flow numbers of the TCP packets through each link, with a second reception-acknowledgement response to be transmitted according to the intra-link numbers, in accordance with the correspondence relationships.

10 Claims, 17 Drawing Sheets

(58) Field of Classification Search
USPC .......................................................... 370/236
See application file for complete search history.

(56) References Cited

U.S. PATENT DOCUMENTS

| | | |
|---|---|---|
| 2008/0022000 A1 | 1/2008 | Furuya et al. |
| 2012/0226802 A1* | 9/2012 | Wu ....................... H04L 1/1825 709/224 |
| 2013/0077501 A1* | 3/2013 | Krishnaswamy ..... H04L 47/193 370/252 |
| 2013/0194963 A1* | 8/2013 | Hampel .................. H04L 45/24 370/254 |
| 2013/0195004 A1* | 8/2013 | Hampel .................. H04L 69/16 370/315 |
| 2014/0351447 A1* | 11/2014 | Annamalaisami .. H04L 65/1069 709/227 |
| 2015/0106530 A1* | 4/2015 | Alanen ................. H04W 80/04 709/231 |
| 2015/0237525 A1* | 8/2015 | Mildh ............... H04W 28/0215 370/230.1 |

FOREIGN PATENT DOCUMENTS

| | | |
|---|---|---|
| JP | 2006-215802 A | 8/2006 |
| WO | WO 2006/051594 A1 | 5/2006 |

* cited by examiner

| ITEM No. | TCP-O | TCP-D1 | TCP-D2 |
|---|---|---|---|
| 1 | 1 | 11 | - |
| 2 | 2 | - | 21 |

FIG. 15

| ITEM No. | TCP-O | TCP-D1 | TCP-D2 |
|---|---|---|---|
| 1 | 1 | 11 | - |
| 2 | 2 | - | 21 |
| 3 | 3 | 12 | - |
| 4 | 4 | - | 22 |

|  | ACK | SACK |
|---|---|---|
| TCP-D1(TCP PROCESS 36) | 12 | – |
| TCP-D2(TCP PROCESS 37) | 23 | – |

LINK AGGREGATION APPARATUS AND METHOD FOR DISTRIBUTING A TCP FLOW TO MULTIPLE LINKS

CROSS-REFERENCE TO RELATED APPLICATION

This application is based upon and claims the benefit of priority of the prior Japanese Patent Application No. 2014-070342 filed on Mar. 28, 2014, and the prior Japanese Patent Application No. 2014-218542 filed on Oct. 27, 2014, the entire contents of which are incorporated herein by reference.

FIELD

The embodiments discussed herein are related to link aggregation apparatus and method for distributing a TCP flow to multiple links.

BACKGROUND

In a general cellular mobile communication system, a plurality of macro cells each of which has a communication area of a radius of several hundred meters to several kilo meters are formed to enable communication. Since a communication area of each macro cell is large as described above, radio field intensity is weak in places, such as a boundary region between micro cells, indoor areas, and basements, and accordingly, communication quality is deteriorated. Therefore, in the future, in a long term evolution (LTE) system which is a next-generation cellular mobile communication system, implementation of a femtocell base station (Femto BS) which is a small base station having an LTE interface is expected.

Furthermore, a public wireless local area network (LAN) developed by cellular carriers has been widely used.

Moreover, in recent years, terminals (such as smart phones) including wireless interfaces employing a cellular method (3G or LTE) and wireless interfaces (that is, wireless adapters) employing a wireless LAN method have rapidly spread.

In such a wireless communication environment, a communication state of simultaneous connection to a plurality of wireless networks employing different wireless communication methods is assumed.

For example, link aggregation (LA) in which a gateway (GW) which accommodates a plurality of wireless networks transmits packets to a terminal using a plurality of communication links as illustrated in FIG. 1 has been proposed. The LA is a communication technique in which a plurality of communication links are simultaneously used for a certain traffic flow (hereinafter referred to as an "internet protocol (IP) flow" or simply referred to as a "flow") so that improved throughput is attained. In the LA, it is particularly important to improve throughput of a flow of a transmission control protocol (TCP) which is used by a large number of applications.

FIG. 1 is a diagram illustrating an example of link aggregation. In FIG. 1, especially, an LTE method and a wireless LAN method are used as the plurality of wireless communication methods. Furthermore, a femto gateway which is one of relaying apparatuses mainly provides the LA.

For example, in the LA of a flow of a certain TCP, the femto gateway which is one of relaying apparatuses uses certain distribution algorithm for a flow of a down link from a server to a communication terminal so as to distribute the flow to the LTE link and the wireless LAN link for each TCP packet.

The related art is disclosed in Yohei HASAGAWA and Tsutomu MURASE, "A multi-path TCP Gateway with Dynamic Path-Load-Balancing", The Institute of Electronics, Information and Communication Engineers, IEICE technical report NS2003-328, IN2003-283(2004-03), pp. 175 to 178.

A path between the femto gateway and the terminal is formed by multihop, that is, the path includes at least one relaying apparatus. Therefore, unlike a path formed by one hop, measurement of an available bandwidth is difficult in the path between the femto gateway and the terminal. The available bandwidth is a remaining bandwidth which is available in the path. When the available bandwidth is exactly obtained, TCP packets may be assigned to the LTE link and the wireless LAN link by the packet distribution algorithm in accordance with the available bandwidth.

Specifically, in a case of a one hop path, that is, a path between a femto base station and the terminal, for example, the available bandwidth may be measured when the femto base station has a function of measuring an available bandwidth. However, in a multihop path, measurement of the available bandwidth is difficult since a large number of apparatuses in a network share hops. Accordingly, it is preferable that congestion/rate control is independently performed in a path of the LTE link and a path of the wireless LAN link between the femto gateway and the terminal. The congestion/rate control is generally a function of adjusting a packet transmission rate so that congestion of the path is avoided in a process in which a transport protocol for transmitting user data actually transmits user data as a packet. This adjustment is performed in accordance with detection of a packet loss, a period of time used to obtain a reception acknowledgement from a reception side, and the like.

The congestion/rate control for each communication link in the link aggregation described above may be realized as follows, for example. FIG. 2 is a diagram illustrating an example of a technique associated with link aggregation.

As illustrated in FIG. 2, the femto gateway sets TCP connections for individual communication links between the terminal and the femto gateway. In FIG. 2, a TCP delivery connection 1 (TCP-D1) and a TCP delivery connection 2 (TCP-D2) are set. The femto gateway replaces a TCP original connection (TCP-O) which is a TCP connection between the server and the terminal with the TCP-D1 and the TCP-D2 by using a transparent TCP proxy function (hereinafter simply referred to as a "TCP proxy" where appropriate). The TCP connections are set for individual connection links since the congestion/rate control is independently operated for individual communication links. Specifically, a TCP process has a function of the congestion/rate control. When congestion/rate control is performed once between the server and the terminal, for example, and when congestion is generated in a certain communication link, the congestion/rate control degrades a transmission rate of an entire TCP flow even when bandwidths of other communication links are available. To avoid the degradation of the transmission rate, congestion/rate control functions which are operated by the TCP-D1 and the TCP-D2 are demanded for individual communication links separately from the congestion/rate control function which is operated by the TCP-O between the server and the terminal.

Specifically, packet distribution algorithm of the femto gateway distributes packets in accordance with results of the congestion/rate control of communication links. Examples of the results of the congestion/rate control include states of transmission buffers (queue lengths or the like). For example, the packet distribution algorithm of the femto gateway distributes a larger number of packets to a communication link in which the number of accumulated packets in a transmission buffer is smaller.

The packets distributed to the communication links are transmitted to the terminal through the TCP connections (the TCP-D1 and the TCP-D2) of the individual communication links.

Thereafter, the terminal replaces the TCP connections (the TCP-D1 and the TCP-D2) for individual communication links with the TCP connection (the TCP-O) between the server and the terminal. Specifically, as an image of protocol stack of the communication links of the link aggregation, the TCP connections (the TCP-D1 and the TCP-D2) for individual communication links are defined as a lower layer of the TCP connection (the TCP-O) between the server and the terminal. The "replacement function" of the terminal is an additional function which is not included in general terminals.

Then the TCP connections (the TCP-D1 and the TCP-D2) for individual communication links of the terminal transmit reception acknowledgement packets (Acknowledgement: ACK) to the TCP connections (the TCP-D1 and the TCP-D2) for individual communication links of the femto gateway. Here, pseudo transmission of the reception acknowledgement packets is performed by a transmission proxy of the femto gateway instead of the terminal. Furthermore, a reception acknowledgement packet output from the TCP-O of the terminal is transmitted to the replacement function of the terminal. Specifically, the process is terminated in the replacement function of the terminal.

The procedure described above will be further described in detail with reference to FIG. 3. FIG. 3 is a diagram illustrating an example of a procedure of (the technique associated with) the link aggregation.

The TCP-O of the server and the TCP-O of the terminal perform a procedure of establishment of a TCP-O connection (that is, three-way handshake) so that a TCP-O connection is established between the server and the terminal (step S1). A control packet is transmitted through the LTE link, for example, in the three-way handshake.

The TCP-O of the server transmits user data 1 (Data1) and user data 2 (Data2) to the terminal (step S2 and step S3). In this case, the TCP-O of the server assigns a sequence number (hereinafter will be also referred to as an "intra-flow number") to a TCP-O header of a TCP-O packet. Here, a sequence number Seq1 is assigned to the TCP-O packet including Data1 (refer to FIG. 4) and a sequence number Seq2 is assigned to the TCP-O packet including Data2. FIG. 4 is a diagram illustrating an example of a format of the TCP-O packet.

When receiving a TCP-O packet Seq1+Data1 and a TCP-O packet Seq2+Data2, a TCP proxy of the femto gateway transmits pseudo ACK3 (refer to FIG. 5) to the server (step S4) in place of the terminal. This process is performed to replace the TCP-O connection with the TCP-D1 connection or the TCP-D2 connection. In this way, since the TCP proxy terminates the TCP-O connection, even when congestion occurs in a certain link, a situation in which congestion/rate control of the TCP-O between the server and the terminal, which immediately degrades a transmission rate, is executed may be avoided. FIG. 5 is a diagram illustrating an example of a format of the pseudo reception acknowledgement packet. As illustrated in FIG. 5, a reception acknowledgement is included in the TCP-O header of the TCP-O packet. A number next to a sequence number of a TCP-O packet which is sequentially received is assigned to ACK. Specifically, since the TCP-O packet having the sequence number Seq1 and the TCP-O packet having the sequence number Seq2 have been received, a number 3 which is next to the number 2 is assigned to ACK to be transmitted.

The TCP proxy of the femto gateway transmits the received TCP-O packet Seq1+Data1 to the packet distribution algorithm (step S5).

The packet distribution algorithm of the femto gateway distributes the TCP-O packet of Seq1+Data1 supplied from the TCP proxy, to a process of the TCP-D1 so as to transmit the TCP-O packet of Seq1+Data1 to the TCP-D1 (step S6).

When receiving the TCP-O packet of Seq1+Data1, the TCP-D1 assigns a sequence number (hereinafter will be also referred to as an "intra-link number") in the TCP-D1 and encapsulates the TCP-O packet of Seq1+Data1 by the TCP-D1 header so as to generate a TCP-D1 packet (refer to FIG. 6). Here, the TCP-D1 includes the assigned intra-link number in the TCP-D1 header. In the example of FIG. 3, an intra-link number Seq11 of the TCP-D1 is added to the TCP packet Seq1+Data1. FIG. 6 is a diagram illustrating an example of a format of the TCP-D1 packet.

The TCP-D1 of the femto gateway transmits the generated TCP-D1 packet Seq11+(Seq1+Data1) to the TCP-D1 of the terminal (step S7).

Upon receiving the TCP-D1 packet Seq11+(Seq1+Data1), the TCP-D1 of the terminal transmits ACK12 to the TCP-D1 of the femto gateway (step S8).

Furthermore, the TCP-D1 of the terminal transmits the received TCP-D1 packet of Seq11+(Seq1+Data1) to a replacement function (step S9).

The replacement function decapsulates the received TCP-D1 packet Seq11+(Seq1+Data1) and transmits the TCP-O packet Seq1+Data1 to the TCP-O of the terminal (step S10). Specifically, the replacement function replaces the TCP connection (the TCP-D1 connection here) in the communication link used in the LA with the TCP connection (the TCP-O connection) between the server and the terminal.

The same process as the process in step S5 to step S10 is performed on the TCP-O packet of Seq2+Data2 (step S11 to step S16).

Upon receiving the TCP-O packet of Seq2+Data2, the TCP-O of the terminal transmits ACK3 to the server (step S17). However, the replacement function receives ACK3 and terminates the process. This is because the TCP proxy has already transmitted the pseudo ACK.

By the procedure above, the link aggregation of the TCP flow between the server and the terminal (that is, the TCP-O flow) may be realized in the related art.

SUMMARY

According to an aspect of the invention, an apparatus performs link aggregation in which a transmission control protocol (TCP) flow is transferred by distributing the TCP flow to a plurality of links. The apparatus includes a plurality of TCP processing units each corresponding to a different one of the plurality of links. The apparatus distributes TCP packets transmitted from a first apparatus on a transmission side to the plurality of links. Each of the plurality of TCP processing units provides each of TCP packets distributed to the each link with an intra-link number. The apparatus manages, for each of TCP packets distributed to each of the plurality of links, correspondence relationships between intra-flow numbers in each TCP flow and the intra-link numbers of the TCP packets distributed to the each link, replaces a first reception acknowledgement response that is transmitted from a second apparatus on a reception side according to the intra-flow numbers of the TCP packets through each of the plurality of links, with a second reception acknowledgement response to be transmitted according to the intra-link numbers, in accordance with the correspondence relationships, and distributes the second reception acknowledgement response to the plurality of TCP processing units.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a diagram illustrating an example of a correspondence relationship table, according to a first embodiment;

DESCRIPTION OF EMBODIMENTS

Figure 1:
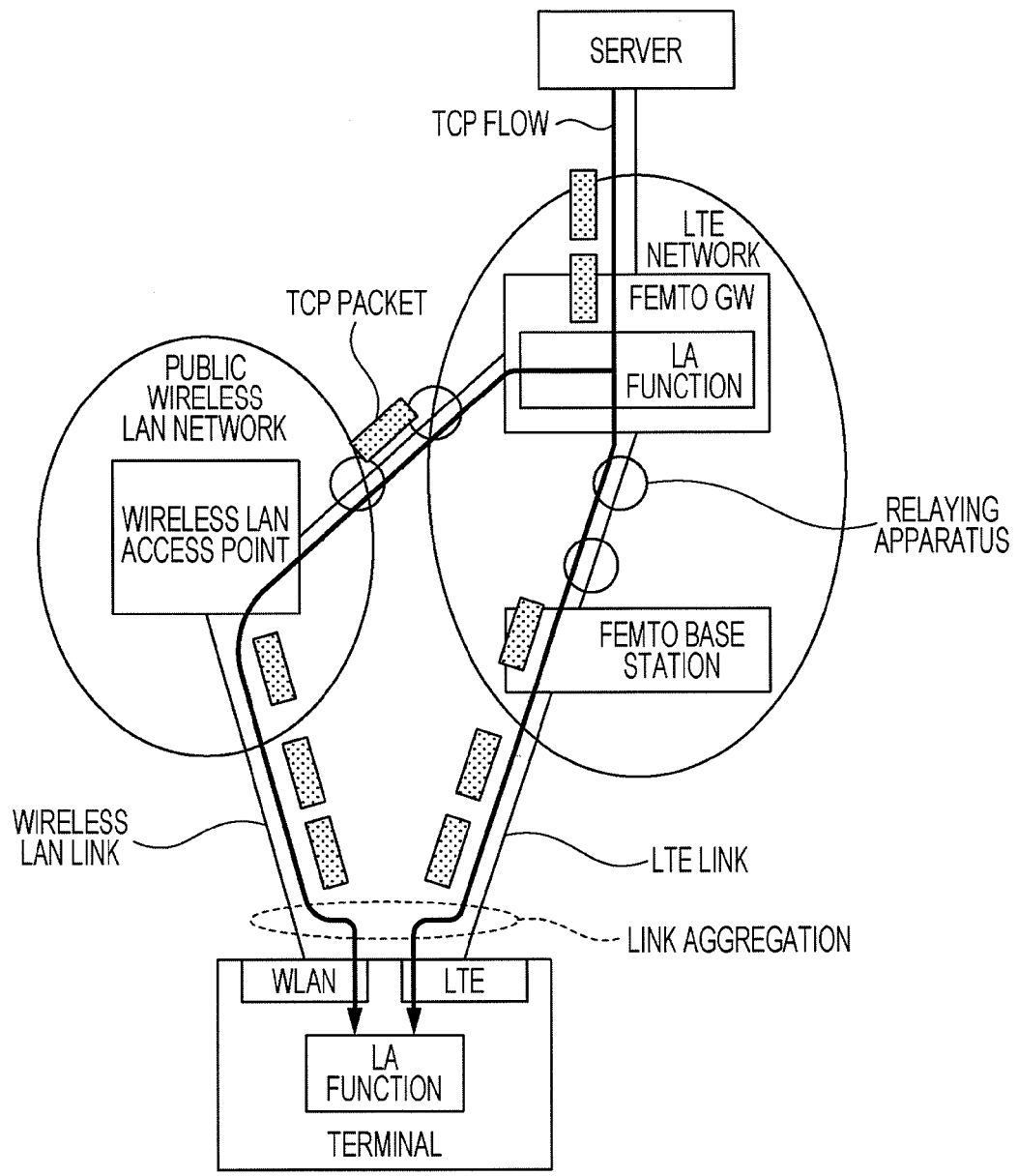
FIG. 1 is a diagram illustrating an example of link aggregation.
Figure 2:
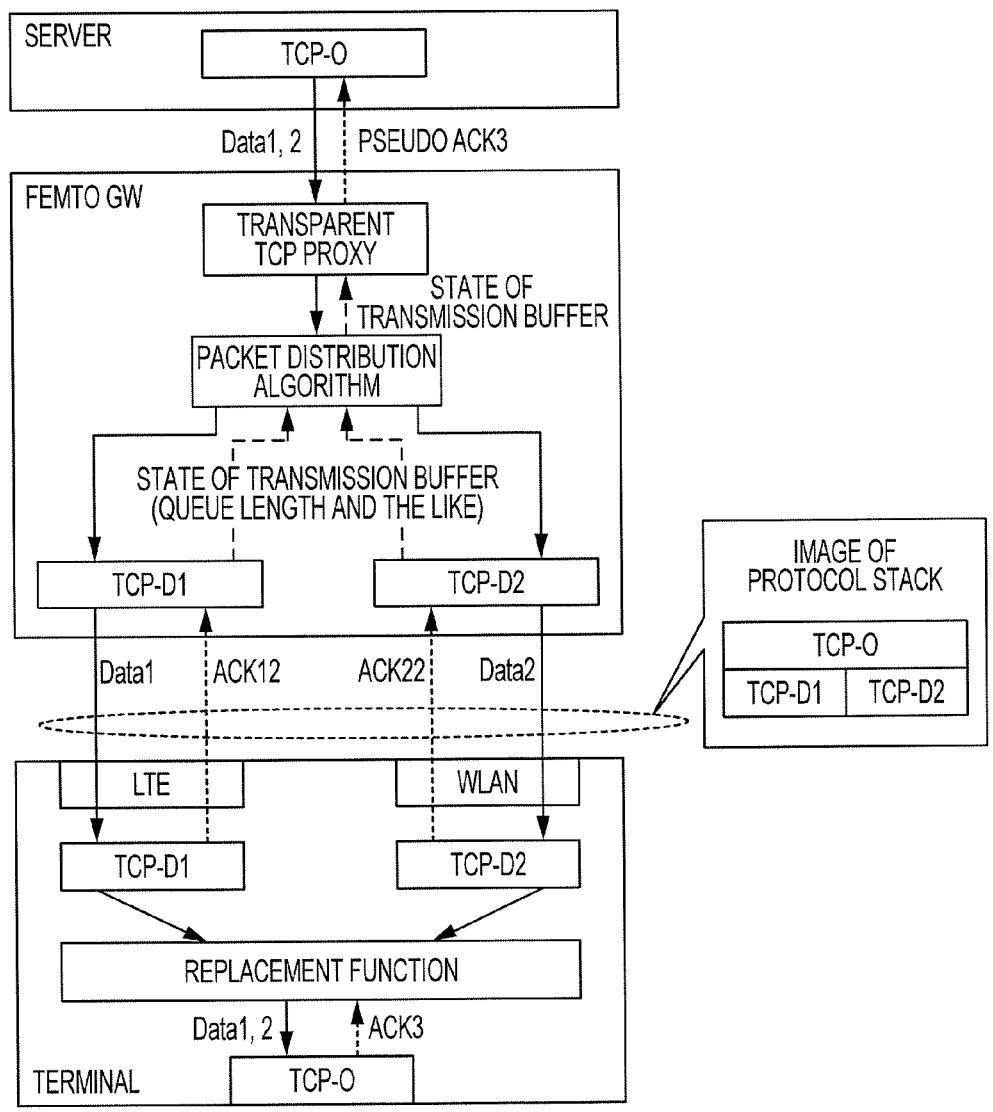
FIG. 2 is a diagram illustrating an example of link aggregation.
Figure 3:
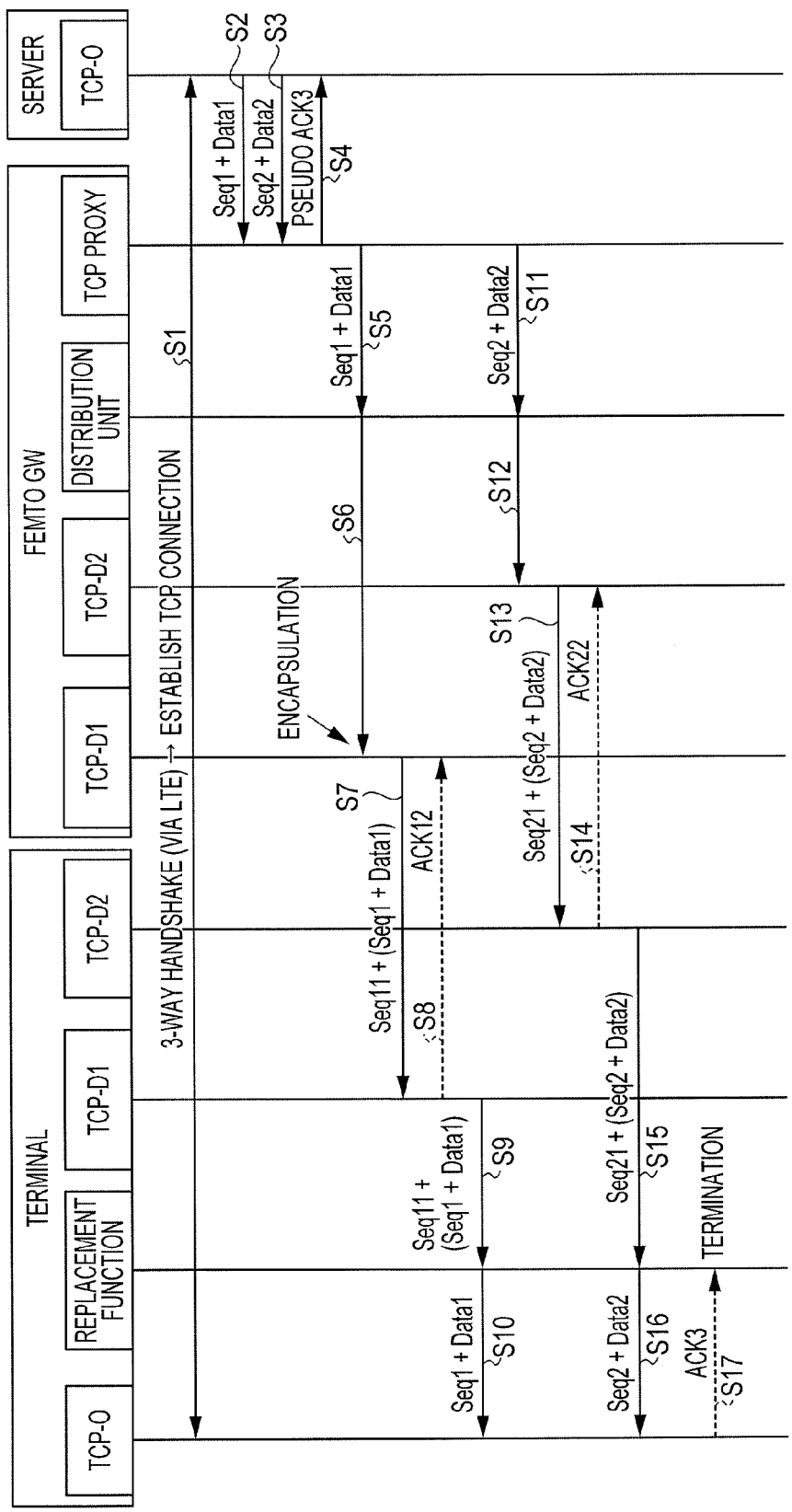
FIG. 3 is a diagram illustrating an example of an operational sequence for link aggregation.
Figure 4:
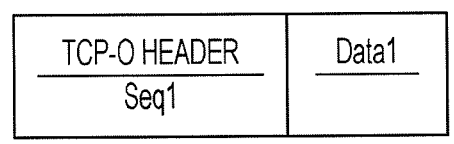
FIG. 4 is a diagram illustrating an example of a format of the TCP-O packet.
Figure 5:
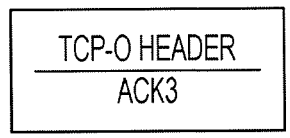
FIG. 5 is a diagram illustrating an example of a format of the pseudo reception acknowledgement packet.
Figure 6:
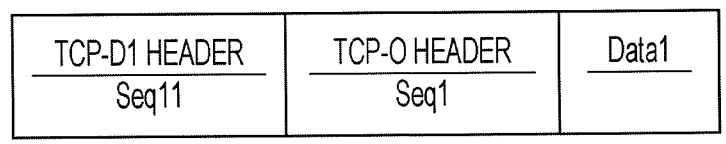
FIG. 6 is a diagram illustrating an example of a format of the TCP-D1 packet.

In the related art, to realize the link aggregation described above, other functions are added to the terminal. Therefore, a burden on a user may increase. Furthermore, in a case of android terminals, for example, users who do not have a super user authority are not allowed to add a function, and accordingly, general users may not add functions. That is, usability may not be ensured. This problem occurs in not only the terminals but also apparatuses which receive packets transmitted by the link aggregation.

Hereinafter, embodiments of a relaying apparatus, a relaying method, and a control program disclosed in this specification will be described in detail with reference to the accompanying drawings. Note that the embodiments do not limit the relaying apparatus, the relaying method, and the control program disclosed in this specification. Furthermore, configurations having the same functions are denoted by the same reference numerals, and redundant description is omitted in the embodiments. Furthermore, the same reference numerals are assigned to equivalent processing steps in the embodiments and redundant description is omitted.

First Embodiment

Outline of Communication System

Figure 7:
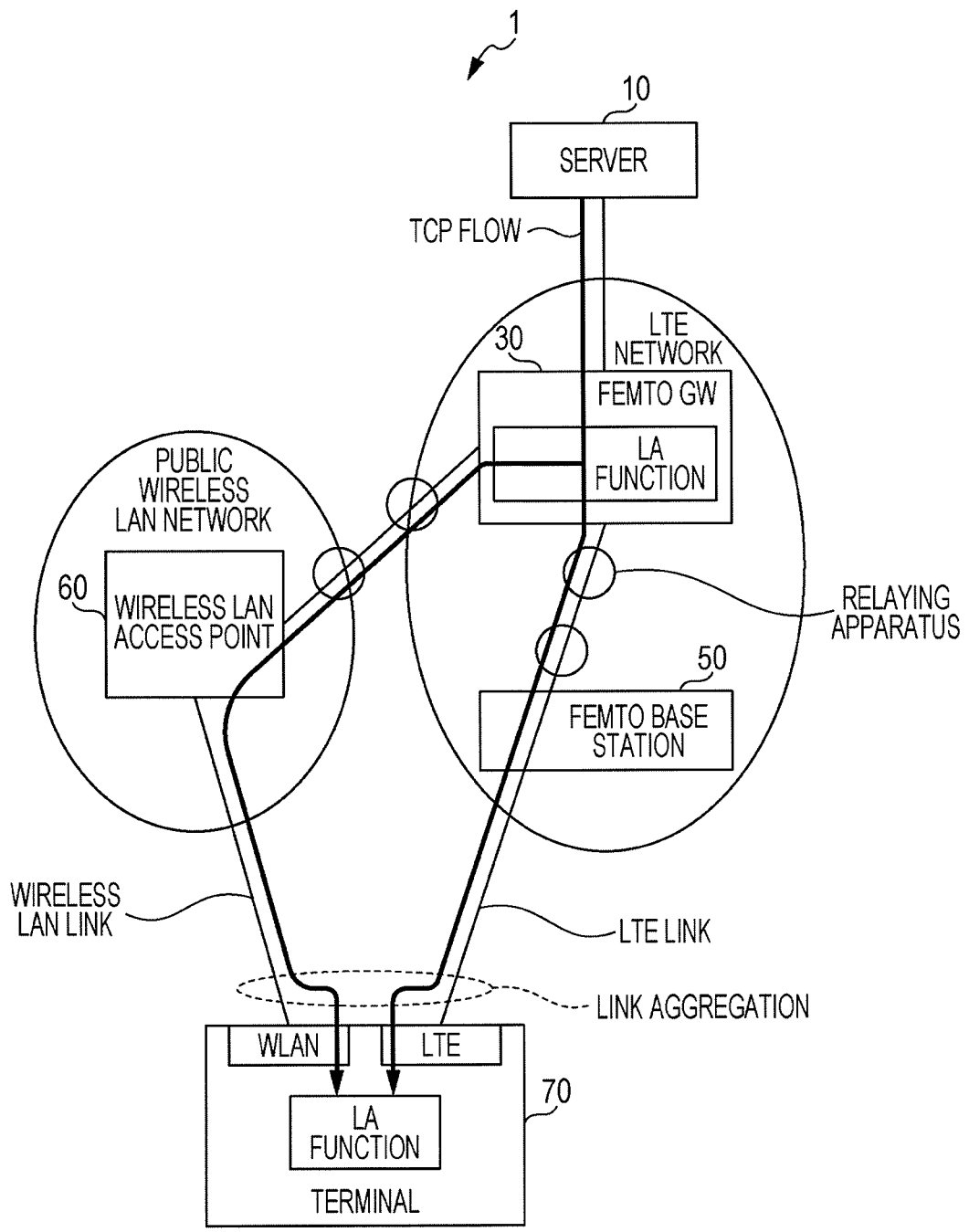
FIG. 7 is a diagram illustrating an example of a communication system, according to a first embodiment.

FIG. 7 is a diagram illustrating an example of a communication system, according to a first embodiment. As illustrated in FIG. 7, a communication system 1 includes a server 10, a femto gateway (GW) 30, a femto base station 50, a wireless LAN access point 60, and a terminal 70.

The femto GW 30 and the femto base station 50 are included in an LTE network. The wireless LAN access point 60 is included in a public wireless LAN network. In the communication system 1, the femto GW 30 is installed as a relaying apparatus having an LA function.

The server 10 is an apparatus on a transmission side of a TCP flow (that is, a TCP-O flow) and transmits the TCP flow to the terminal 70 which is an apparatus on a reception side.

The femto GW 30 distributes the TCP flow supplied from the server 10 to a plurality of communication links so as to transfer the TCP flow to the terminal 70. Specifically, the femto GW 30 performs link aggregation (LA). In the case, the plurality of communication links used in the LA is two links, that is, the LTE link and the wireless LAN link.

The femto GW 30 assigns intra-link numbers used in the communication links to which TCP packets (that is, TCP-O packets) are distributed, to the TCP packets.

Then the femto GW 30 manages the correspondence relationships between intra-flow numbers in the TCP flow and the assigned intra-link numbers of the transferred TCP packets.

Thereafter, the terminal 70 transmits an acknowledgement response packet (hereinafter will be also referred to as a "first reception acknowledgement response") to the femto GW 30 in accordance with the intra-flow number of the TCP packet transferred from the femto GW 30 via the LA. A path which transmits the first reception acknowledgement response may be the LTE link or the wireless LAN link.

Upon receiving the first reception acknowledgement response, the femto GW 30 changes the first reception acknowledgement response to acknowledgement response packets (hereinafter will be also referred to as "second reception acknowledgement responses") based on the intra-link numbers, in accordance with the correspondence relationships. By this, retransmission control, transmission rate control, and the like may be performed in a unit of a communication link.

As described above, the femto GW 30 transfers the TCP-O packets supplied from the server 10 to the terminal 70 through the plurality of communication links without changing a form of the TCP-O packets. By this, since the terminal 70 may receive the TCP-O packets by a TCP-O connection between the server 10 and the terminal 70, the link aggregation may be realized without adding the replacement function described above to the terminal 70.

Furthermore, the femto GW 30 manages the correspondence relationships between the intra-flow numbers in the TCP-O flow and the assigned intra-link numbers of the transferred TCP packets. Then, upon receiving the first reception acknowledgement response, the femto GW 30 replaces the first reception acknowledgement response with the second reception acknowledgement responses in accordance with the correspondence relationships. This management function is realized by header removal units 34 and 35, header conversion units 38 and 39, and a header replacement unit 42, which will be described hereinafter, in the first embodiment. Specifically, the header removal units 34 and 35, the header conversion units 38 and 39, and the header replacement unit 42 function as a management unit. By this, retransmission control and transmission rate control may be performed in a unit of a communication link.

The LA described above may be executed for each TCP flow. Here, when different apparatuses on a transmission side or different apparatuses on a reception side are used between TCP flows, the TCP flows are different from each other. Furthermore, when the same apparatuses on the transmission side and the same apparatuses on the reception side are used but different applications are used between TCP flows, the TCP flows are different from each other.

Example of Configuration of Relaying Apparatus

Figure 8:
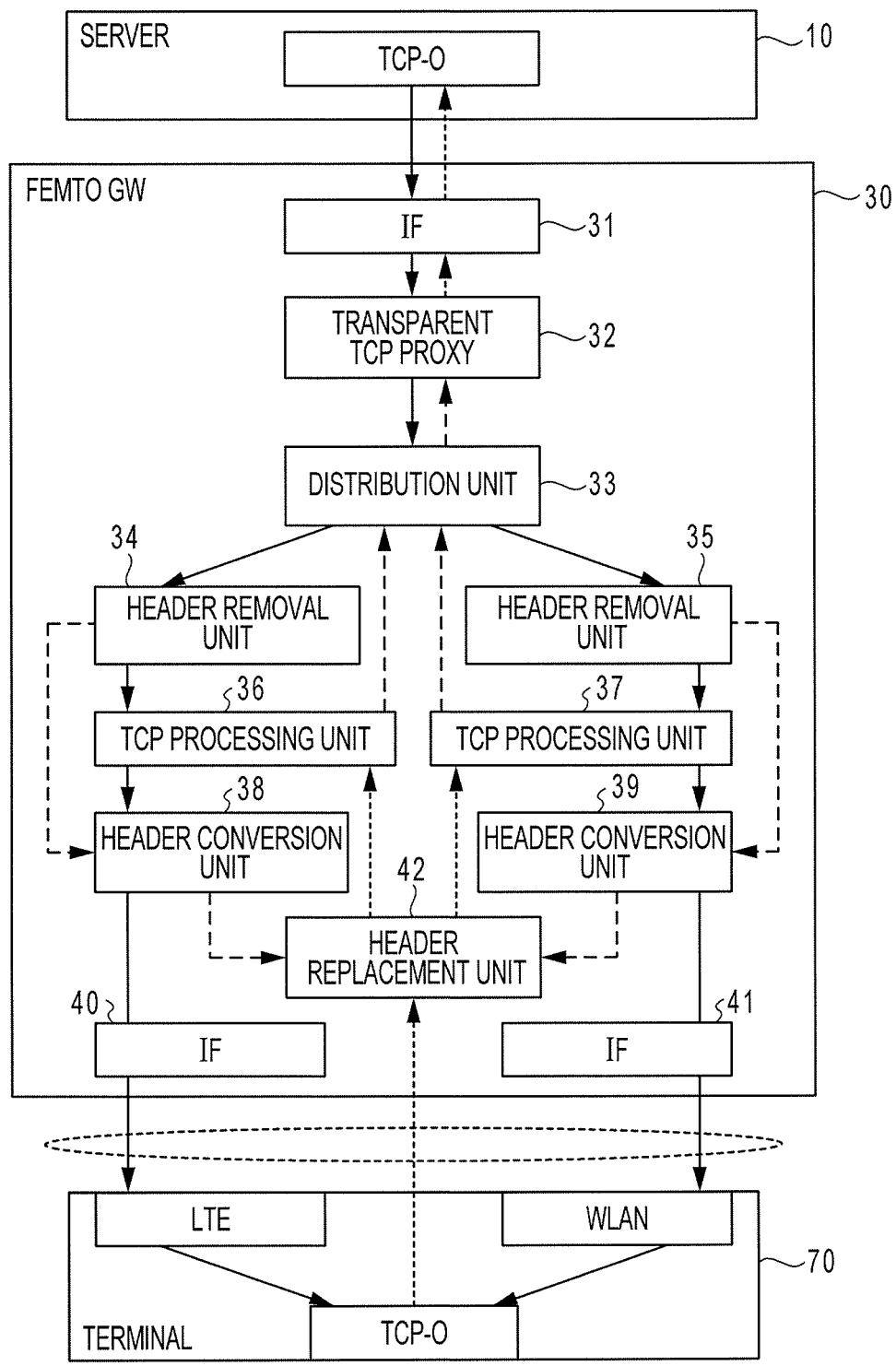
FIG. 8 is a diagram illustrating an example of a femto GW serving as a relay apparatus, according to a first embodiment.

FIG. 8 is a diagram illustrating an example of a femto GW serving as a relay apparatus, according to a first embodiment. In FIG. 8, in addition to the femto GW 30, the server 10 and the terminal 70 are also illustrated for convenience sake. The femto base station 50 and the wireless LAN access point 60 are omitted in FIG. 8.

In FIG. 8, the femto GW 30 includes interfaces (IFs) 31, 40, and 41, a transparent TCP proxy (Proxy) 32, a distribution unit 33, the header removal units 34 and 35, TCP processing units 36 and 37, the header conversion units 38 and 39, and the header replacement unit 42.

The IF 31 is disposed on a side of the server 10 in the femto GW 30 and is an Ethernet (registered trademark) interface, for example.

The IF 40 is disposed on a side of the femto base station 50 in the femto GW 30 and is an Ethernet (registered trademark) interface, for example.

The IF 41 is disposed on a side of the wireless LAN access point 60 in the femto GW 30 and is an Ethernet (registered trademark) interface, for example.

The transparent TCP proxy 32 outputs the TCP-O packets supplied from the server 10 serving as an apparatus on a transmission side to the distribution unit 33. Furthermore, the transparent TCP proxy 32 transmits a pseudo reception acknowledgement packet responsive to the received TCP-O packets, to the server 10.

The distribution unit 33 distributes the TCP-O packets supplied from the server 10 which is the apparatus on the transmission side to a plurality of communication links (here, the LTE link serving as a first link and the wireless LAN link serving as a second link). The TCP-O packet distributed to the LTE link is output to the header removal unit 34 and the TCP-O packet distributed to the wireless LAN link is output to the header removal unit 35.

The header removal unit 34 removes a TCP-O header from the TCP-O packet distributed to the LTE link and outputs the packet from which the TCP-O header is removed, to the TCP processing unit 36. Furthermore, the header removal unit 34 outputs the TCP-O header which is removed from the TCP-O packet (that is, an intra-flow number of the TCP-O packet) to the header conversion unit 38.

The header removal unit 35 removes a TCP-O header from the TCP-O packet distributed to the wireless LAN link and outputs the packet from which the TCP-O header is removed, to the TCP processing unit 37. Furthermore, the header removal unit 35 outputs the TCP-O header which is removed from the TCP-O packet (that is, an intra-flow number of the TCP-O packet) to the header conversion unit 39.

The TCP processing unit 36 adds an intra-link number (that is, a first intra-link number) in the LTE link to the packet supplied from the header removal unit 34 and outputs the packet to which the first intra-link number is added as a header, to the header conversion unit 38. Furthermore, the TCP processing unit 36 executes retransmission control, rate control, and the like in response to a second reception acknowledgement response supplied from the header replacement unit 42.

The TCP processing unit 37 adds an intra-link number (that is, a second intra-link number) in the wireless LAN link, to the packet supplied from the header removal unit 35 and outputs the packet to which the second intra-link number is added as a header, to the header conversion unit 39. Furthermore, the TCP processing unit 37 executes retransmission control, rate control, and the like in response to a second reception acknowledgement response supplied from the header replacement unit 42.

The header conversion unit 38 removes the header from the packet supplied from the TCP processing unit 36 and transfers a TCP-O packet obtained by assigning (adding) the TCP-O header removed by the header removal unit 34 to the packet from which the header thereof is removed, to the terminal 70 which is the apparatus on the reception side. Furthermore, the header conversion unit 38 generates the correspondence relationships between intra-flow numbers and intra-link numbers of transferred TCP-O packets, and outputs the generated correspondence relationships to the header replacement unit 42.

The header conversion unit 39 removes the header from the packet supplied from the TCP processing unit 37 and transfers a TCP-O packet obtained by assigning (adding) the TCP-O header removed by the header removal unit 35 to the packet from which the header thereof is removed, to the terminal 70 which is the apparatus on the reception side. Furthermore, the header conversion unit 39 generates the correspondence relationships between intra-flow numbers and intra-link numbers of transferred TCP-O packets and outputs the generated correspondence relationships to the header replacement unit 42.

The header replacement unit 42 stores the "correspondence relationships" supplied from the header conversion units 38 and 39. Furthermore, the header replacement unit 42 receives a reception acknowledgement response (that is, the first reception acknowledgement response described above) which is supplied from the terminal 70 serving as the apparatus on the reception side in response to the TCP-O packet transferred from the header conversion unit 38 or the header conversion unit 39. Note that the first reception acknowledgement response may be transmitted from the terminal 70 to the femto GW 30 through the LTE link or the wireless LAN link.

Furthermore, the header replacement unit 42 replaces the received first reception acknowledgement response with a reception acknowledgement response based on the intra-link number (that is, the second reception acknowledgement response described above). Then the header replacement unit 42 outputs the second reception acknowledgement response to the TCP processing unit (that is, the TCP processing unit 36 or the TCP processing unit 37) which has added the intra-link number.

Example of Operation of Communication System

Figure 9:
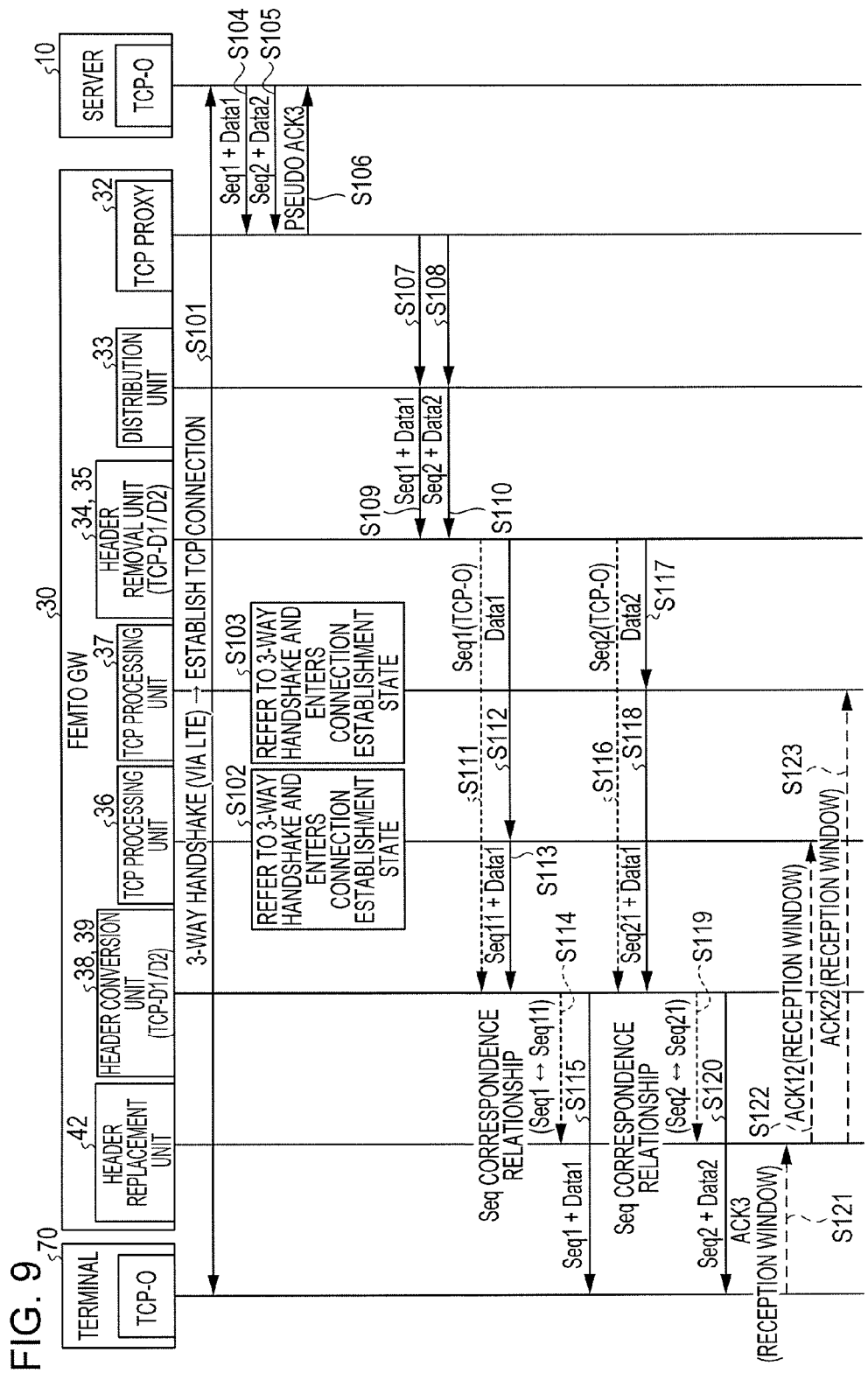
FIG. 9 is a diagram illustrating an example of an operational sequence of a communication system, according to a first embodiment.
Figure 10:
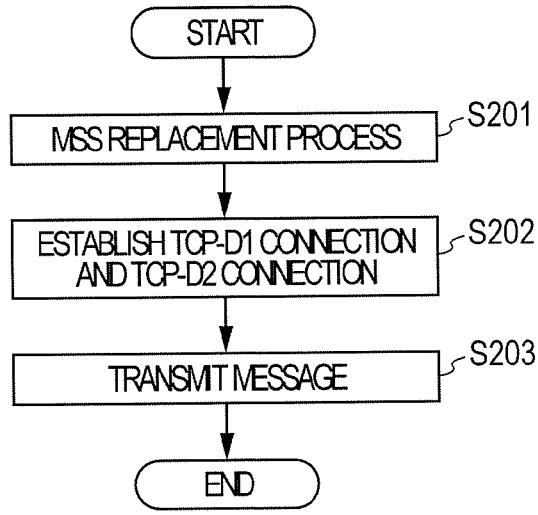
FIG. 10 is a diagram illustrating an example of an operational flowchart for processing of a femto GW, according to a first embodiment.
Figure 11:
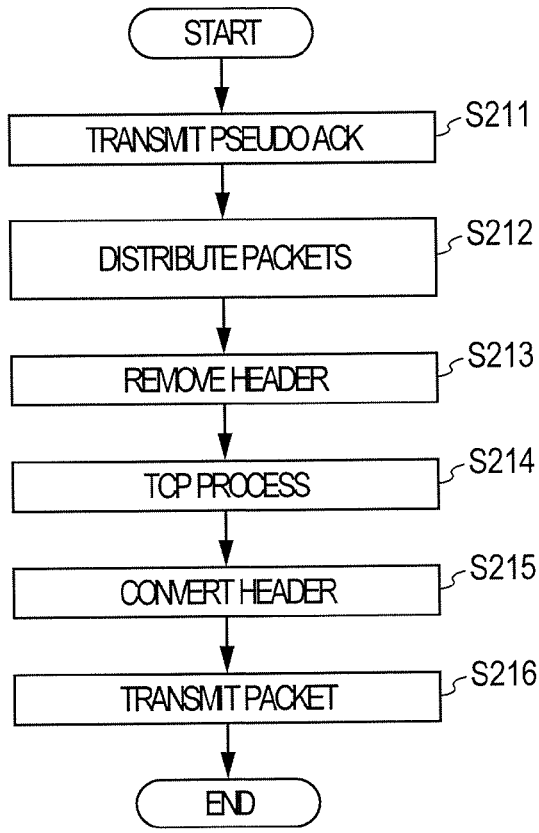
FIG. 11 is a diagram illustrating an example of an operational flowchart for processing of a femto GW, according to a first embodiment.
Figures 12, 13:
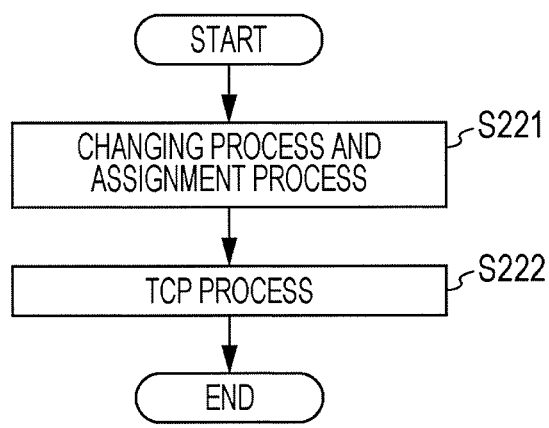
FIG. 12 is a diagram illustrating an example of an operational flowchart for processing of a femto GW, according to a first embodiment.
FIG. 13 is a diagram illustrating an example of a correspondence relationship table, according to a first embodiment.

An example of a processing operation of the communication system 1 having the configuration described above will be described. An example of a processing operation of the femto GW 30 serving as the relaying apparatus will be mainly described. FIG. 9 is a diagram illustrating an example of an operational sequence of a communication system, according to a first embodiment. The operational sequence in FIG. 9 is performed when reception of a TCP packet is successfully performed. The femto base station 50 and the wireless LAN access point 60 are omitted in FIG. 9. FIGS. 10 to 12 are diagrams each illustrating an example of an operational flowchart for processing of a femto GW, according to a first embodiment. In particular, an operational flowchart for three-way handshake is illustrated in FIG. 10, and an operational flowchart for transferring a data packet is illustrated in FIG. 11. Furthermore, an operational flowchart for replacing a reception acknowledgement response is illustrated in FIG. 12.

Process of Three-Way Handshake

The TCP-O of the server 10 and the TCP-O of the terminal 70 perform a procedure of establishing a TCP-O connection (that is, three-way handshake) so that a TCP-O connection is established between the server 10 and the terminal 70 (step S101).

In this three-way handshake, a control packet (that is, a control message) is transmitted between the TCP-O of the server 10 and the TCP-O of the terminal 70 through the femto GW 30. In this three-way handshake, a maximum segment size (MSS) is determined.

When the control packet is received by the femto GW 30, the operational flowchart of FIG. 10 is started. The TCP proxy 32 of the femto GW 30 replaces a value of a maximum segment size included in the received control packet with a smallest value among values of maximum segment sizes of the communication links used in the LA (step S201). By this, a division process to be performed on a TCP-O packet may be avoided in the process of transferring a data packet described below.

Thereafter, the TCP proxy 32 of the femto GW 30 causes the TCP processing unit 36 to enter a state in which a TCP-D1 connection has been established and causes the TCP processing unit 37 to enter a state in which a TCP-D2 connection has been established (step S202, step S102, and step S103). For example, the TCP proxy 32 generates a control packet to be transmitted by the three-way handshake, and transmits the control packet to the TCP processing units 36 and 37. This causes the TCP processing unit 36 to enter (transition to) the state in which the TCP-D1 connection has been established, and causes the TCP processing unit 37 to enter (transition to) the state in which the TCP-D2 connection has been established.

Then the femto GW 30 transmits the control packet in which the maximum segment size is rewritten (step S203).

Process of Transferring Data Packet

The TCP-O of the server 10 transmits a TCP-O packet of Seq1+Data1 and a TCP-O packet of Seq2+Data2 to the terminal 70 (step S104 and step S105).

When the data packets are received by the femto GW 30, the flowchart of FIG. 11 is started. In the femto GW 30, the TCP proxy 32 transmits pseudo ACK to the server 10 (step S211 and step S106). Since the TCP-O packet of Seq1+Data1 and the TCP-O packet of Seq2+Data2 have been received, a number of the pseudo ACK becomes 3.

The TCP proxy 32 outputs the received TCP-O packet of Seq1+Data1 and the received TCP-O packet of Seq2+Data2 to the distribution unit 33 (step S107 and step S108).

The distribution unit 33 distributes the TCP-O packets supplied from the TCP proxy 32 to the LTE link and the wireless LAN link (step S212). In this embodiment, the TCP-O packet of Seq1+Data1 is distributed to the LTE link and the TCP-O packet of Seq2+Data2 is distributed to the wireless LAN link. Therefore, the TCP-O packet of Seq1+Data1 is output to the header removal unit 34 (step S109) and the received TCP-O packet Seq2+Data2 is output to the header removal unit 35 (step S110).

The header removal unit 34 removes a TCP-O header (that is, Seq1) from the TCP-O packet of Seq1+Data1 supplied from the distribution unit 33 (step S213) and outputs the removed TCP-O header to the header conversion unit 38 (step S111). Furthermore, the header removal unit 34 outputs the packet (that is, Data1) from which the TCP-O header (that is, Seq1) is removed to the TCP processing unit 36 (step S112).

Then the TCP processing unit 36 executes a TCP process (step S214). The TCP process performed here includes a process of assigning a first intra-link number to the packet received from the header removal unit 34 and a process of adding the assigned first intra-link number to the packet as a header. Thereafter, the TCP processing unit 36 outputs a packet of Seq11+Data1 to which the first intra-link number Seq11 is added as a header of the packet of Data1, to the header conversion unit 38 (step S113).

The header conversion unit 38 executes a process of converting the header of the packet supplied from the TCP processing unit 36 (step S215). Specifically, the header conversion unit 38 removes the header (that is, Seq11) of the packet of Seq11+Data1 supplied from the TCP processing unit 36 and assigns (adds) the TCP-O header (that is, Seq1)

removed by the header removal unit 34 to the packet (that is, Data1) from which the header (that is Seq11) is removed.

Thereafter, the header conversion unit 38 transmits the TCP-O packet of Seq1+Data1 obtained by the header conversion process, to the terminal 70 (step S216 and step S115).

Furthermore, the header conversion unit 38 generates a correspondence relationship between the intra-flow number and the intra-link number of the transferred TCP-O packet of Seq1+Data1, and outputs the generated correspondence relationship to the header replacement unit 42 (step S114). In the case, the correspondence relationship between Seq1 and Seq11 is output. The header replacement unit 42 stores this correspondence relationship in a correspondence relationship table. FIG. 13 is a diagram illustrating an example of a correspondence relationship table, according to a first embodiment. In FIG. 13, values in the column of the TCP-O correspond to intra-flow numbers, values in the column of the TCP-D1 correspond to first intra-link numbers, and values of the column of the TCP-D2 correspond to second intra-link numbers.

Furthermore, a process the same as that performed on the TCP-O packet of Seq1+Data1 is also performed on the TCP-O packet of Seq2+Data2.

Specifically, the header removal unit 35 removes a TCP-O header (that is, Seq2) from the TCP-O packet of Seq2+Data2 supplied from the distribution unit 33 (step S213), and outputs the removed TCP-O header to the header conversion unit 39 (step S116). Furthermore, the header removal unit 35 outputs the packet (that is, Data1) from which the TCP-O header (that is, Seq1) is removed, to the TCP processing unit 37 (step S117).

Then the TCP processing unit 37 executes a TCP process (step S214). The TCP process performed here includes a process of assigning a second intra-link number to the packet supplied from the header removal unit 35, and a process of add the assigned second intra-link number to the packet as a header. Thereafter, the TCP processing unit 37 outputs a packet of Seq21+Data2 to which a second intra-link number Seq21 is added as a header of the packet Data2, to the header conversion unit 39 (step S118).

The header conversion unit 39 executes a process of converting the header of the packet supplied from the TCP processing unit 37 (step S215). Specifically, the header conversion unit 39 removes the header (that is, Seq21) from the packet of Seq21+Data2 supplied from the TCP processing unit 37, and adds the TCP-O header (that is, Seq2) removed by the header removal unit 35 to the packet (that is, Data2) from which the header (that is Seq21) is removed.

Thereafter, the header conversion unit 39 transmits the TCP-O packet of Seq2+Data2 obtained by the header conversion process, to the terminal 70 (step S216 and step S120). Here, the femto GW 30 consequently transfers the TCP-O packets supplied from the server 10 to the terminal 70 as they are. Specifically, the TCP-O is present in a protocol stack in a plurality of paths between the femto GW 30 and the terminal 70, but the TCP-D1 and the TCP-D2 do not appear. That is, the femto GW 30 hides the TCP-D1 and the TCP-D2 from the terminal 70. This allows the link aggregation to be realized without adding the replacement function described above to the terminal 70.

Furthermore, the header conversion unit 39 generates a correspondence relationship between the intra-flow number and the intra-link number of the transferred TCP-O packet of Seq2+Data2, and outputs the generated correspondence relationship to the header replacement unit 42 (step S119). Specifically, the correspondence relationship between Seq2 and Seq21 is output.

Process of Changing Reception Acknowledgement Response

When receiving the TCP-O packet of Seq2+Data2, the TCP-O of the terminal 70 transmits a first reception acknowledge response (ACK3 here) to the femto GW 30 (step S121).

When the first reception acknowledgement response is received by the femto GW 30, the operational flowchart of FIG. 12 is started. In the femto GW 30, the header replacement unit 42 executes a header replacement process and a packet distribution process (step S221). Specifically, upon receiving a first reception acknowledgement response (ACK3 here), the header replacement unit 42 replaces the received first reception acknowledgement response with a reception acknowledgement response based on the intra-link number (that is, the second reception acknowledgement response described above) in accordance with the stored correspondence relationships described above. For example, ACK3 represents that TCP-O packets having intra-flow numbers not greater than 2 have been received. Accordingly, the header replacement unit 42 generates a second reception acknowledgement response (ACK12) representing that the packet having the intra-link number 11 corresponding to the intra-flow number 1 in the correspondence relationship table has been received, and outputs the generated second reception acknowledgement response (ACK12) to the TCP processing unit 36 (step S122). Furthermore, the header replacement unit 42 generates a second reception acknowledgement response (ACK22) representing that the packet having the intra-link number 21 corresponding to the intra-flow number 2 in the correspondence relationship table has been received, and outputs the generated second reception acknowledgement response (ACK22) to the TCP processing unit 37 (step S123). Here, the first reception acknowledgement response transmitted from the TCP-O of the terminal 70 includes a reception window value. Therefore, the header replacement unit 42 includes the reception window value into each of the second reception acknowledgement responses (ACK12 and ACK22).

Thereafter, upon receiving the second reception acknowledgement responses ACK12 and ACK22, the TCP processing units 36 and 37 respectively perform the TCP process (step S222). The TCP process includes a retransmission process and a rate control process.

Figure 14:
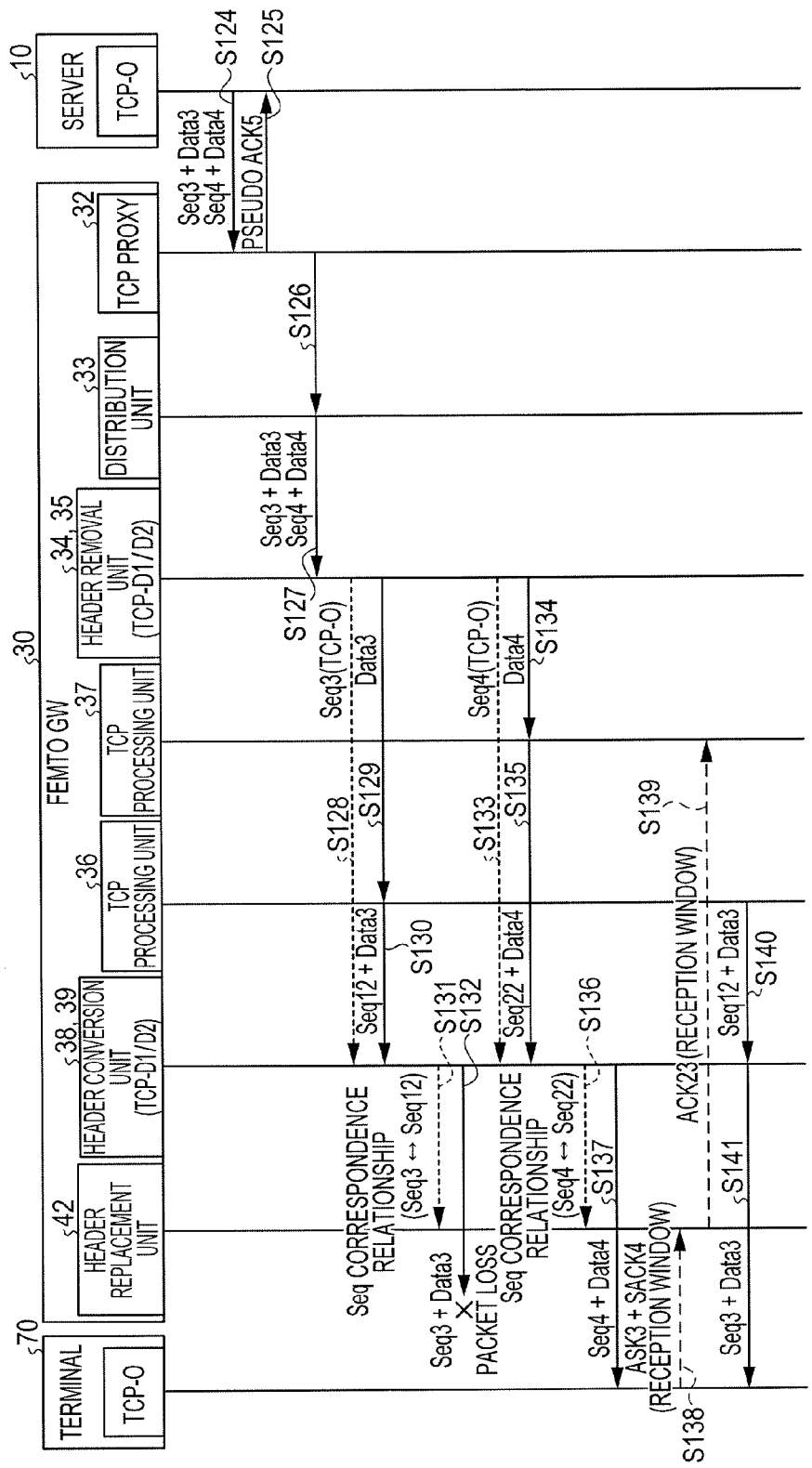
FIG. 14 is a diagram illustrating an example of an operational sequence of a communication system, according to a first embodiment.

Next, a process performed when reception of a TCP packet is not successfully performed will be described. FIG. 14 is a diagram illustrating an example of an operational sequence of a communication system, according to a first embodiment. The operational sequence in FIG. 14 is performed when reception of a TCP packet is not successfully performed. Furthermore, the operational sequence in FIG. 14 is illustrated as a sequel of FIG. 9.

The TCP-O of the server 10 transmits a TCP-O packet of Seq3+Data3 and a TCP-O packet of Seq4+Data4 to the terminal 70 (step S124).

When the data packet is received by the femto GW 30, the operational flowchart of FIG. 11 is started. In the femto GW 30, the TCP proxy 32 transmits pseudo ACK to the server 10 (step S211 and step S125). Since the TCP-O packet of Seq3+Data3 and the TCP-O packet of Seq4+Data4 have been received, a number of the pseudo ACK becomes 5.

The TCP proxy 32 outputs the received TCP-O packet of Seq3+Data3 and the received TCP-O packet of Seq4+Data4 to the distribution unit 33 (step S126).

The distribution unit 33 distributes the TCP-O packets supplied from the TCP proxy 32, to the LTE link and the wireless LAN link (step S212). In this embodiment, the TCP-O packet of Seq3+Data3 is distributed to the LTE link, and the TCP-O packet of Seq4+Data4 is distributed to the wireless LAN link. Therefore, the TCP-O packet of Seq3+Data3 is output to the header removal unit 34, and the TCP-O packet of Seq4+Data4 is output to the header removal unit 35 (step S127).

The header removal unit 34 removes a TCP-O header (that is, Seq3) from the TCP-O packet of Seq3+Data3 supplied from the distribution unit 33 (step S213) and outputs the removed TCP-O header to the header conversion unit 38 (step S128). Furthermore, the header removal unit 34 outputs the packet (that is, Data 3) from which the TCP-O header (that is, Seq3) has been removed, to the TCP processing unit 36 (step S129).

Then the TCP processing unit 36 executes a TCP process (step S214). The TCP process performed here includes a process of assigning a first intra-link number to the packet supplied from the header removal unit 34 and a process of providing the first intra-link number to the packet as a header. Thereafter, the TCP processing unit 36 outputs a packet of Seq12+Data3 to which a first intra-link number Seq12 is provided as a header of the packet Data3, to the header conversion unit 38 (step S130).

The header conversion unit 38 executes a process of converting the header of the packet supplied from the TCP processing unit 36 (step S215). Specifically, the header conversion unit 38 removes the header (that is, Seq12) from the packet of Seq12+Data3 supplied from the TCP processing unit 36 and provides the TCP-O header (that is, Seq3) removed by the header removal unit 34 to the packet (that is, Data3) from which the header (that is, Seq12) has been removed.

Thereafter, the header conversion unit 38 transmits the TCP-O packet of Seq3+Data3 obtained by the header conversion process, to the terminal 70 (step S216 and step S132). In the case, it is assumed that the TCP-O packet of Seq3+Data3 does not reach the terminal 70, that is, packet loss occurs.

Meanwhile, the header conversion unit 38 generates a correspondence relationship between the intra-flow number and the intra-link number of the transferred TCP-O packet of Seq3+Data3, and outputs the generated correspondence relationship to the header replacement unit 42 (step S131). Specifically, the correspondence relationship between Seq3 and Seq12 is output. The header replacement unit 42 stores this correspondence relationship in the correspondence relationship table. FIG. 15 is a diagram illustrating an example of a correspondence relationship table, according to a first embodiment. In FIG. 15, values in the column of the TCP-O correspond to intra-flow numbers, values in the column of the TCP-D1 correspond to the first intra-link numbers, and values of the column of the TCP-D2 correspond to the second intra-link numbers.

Furthermore, a process the same as that performed on the TCP-O packet of Seq3+Data3 is performed on the TCP-O packet of Seq4+Data4.

Specifically, the header removal unit 35 removes a TCP-O header (that is, Seq4) from the TCP-O packet of Seq4+Data4 supplied from the distribution unit 33 (step S213) and outputs the removed TCP-O header to the header conversion unit 39 (step S133). Furthermore, the header removal unit 35 outputs the packet (that is, Data4) from which the TCP-O header (that is, Seq4) has been removed, to the TCP processing unit 37 (step S134).

Then the TCP processing unit 37 executes a TCP process (step S214). The TCP process performed here includes a process of assigning a second intra-link number to the packet supplied from the header removal unit 35, and a process of providing the second intra-link number to the packet as a header. Thereafter, the TCP processing unit 37 outputs a packet of Seq22+Data4 to which a second intra-link number Seq22 is provided as a header of the packet Data4, to the header conversion unit 39 (step S135).

The header conversion unit 39 executes a process of converting the header of the packet supplied from the TCP processing unit 37 (step S215). Specifically, the header conversion unit 39 removes the header (that is, Seq22) from the packet of Seq22+Data4 supplied from the TCP processing unit 37 and provides the TCP-O header (that is, Seq4) removed by the header removal unit 35 to the packet (that is, Data4) from which the header (that is, Seq22) has been removed.

Thereafter, the header conversion unit 39 transmits the TCP-O packet of Seq4+Data4 obtained by the header conversion process, to the terminal 70 (step S216 and step S137).

Meanwhile, the header conversion unit 39 generates a correspondence relationship between the intra-flow number and the intra-link number of the transferred TCP-O packet of Seq4+Data4, and outputs the generated correspondence relationship to the header replacement unit 42 (step S136). Specifically, the correspondence relationship between Seq4 and Seq22 is output.

Upon receiving the TCP-O packet of Seq4+Data4, the TCP-O of the terminal 70 transmits a first reception acknowledge response (ACK3+SACK4 here) to the femto GW 30 (step S138). Here, unlike the ACK, selective ACK (SACK) includes a number the same as the Seq number which has been received.

When the first reception acknowledgement response is received by the femto GW 30, the operational flowchart of FIG. 12 is started. In the femto GW 30, the header replacement unit 42 executes a replacement process and a packet distribution process (step S221). Specifically, upon receiving the first reception acknowledgement response (ACK3+SACK4 here), the header replacement unit 42 replaces the received first reception acknowledgement response with a reception acknowledgement response based on the intra-link number (that is, a second reception acknowledgement response described above) in accordance with the stored correspondence relationship described above. Specifically, ACK3 represents that all TCP-O packets having intra-flow numbers not greater than 2 have been received. SACK4 represents that an intra-flow number of a TCP-O packet which is received after a skipped TCP-O packet, that is, a TCP-O packet which has not been received, is 4. Accordingly, the header replacement unit 42 generates a second reception acknowledgement response (ACK23) representing that the packet having the intra-link number of 22 corresponding to the intra-flow number 4 in the correspondence relationship table has been received, and outputs the second reception acknowledgement response (ACK23) to the TCP processing unit 37 (step S139). Here, the first reception acknowledgement response transmitted from the TCP-O of the terminal 70 includes a reception window value. Therefore, the header replacement unit 42 includes the reception window value into the second reception acknowledgement response (ACK23).

The TCP processing unit 36 determines that a packet loss has occurred for a packet when the second reception acknowledgement response is not received in a predetermined period of time after transmitting the packet. Thereafter, the TCP processing unit 36 outputs a packet of Seq12+Data3 as retransmission to the header conversion unit 38 (step S140). Here, the TCP processing unit 36 degrades a transmission rate. On the other hand, since the TCP processing unit 37 has received the second reception acknowledgement response (ACK23), the TCP processing unit 37 does not degrade a transmission rate. As a result, when compared with a transmission buffer of the TCP processing unit 37, a number of remaining packets in a transmission buffer of the TCP processing unit 36 is greater. Accordingly, the distribution unit 33 distributes a greater number of TCP-O packets to the TCP processing unit 37 which has a smaller number of remaining packets, that is, the wireless LAN link.

The header conversion unit 38 executes a process of converting the header of the packet supplied from the TCP processing unit 36 (step S215). Specifically, the header conversion unit 38 removes the header (that is, Seq12) from the packet of Seq12+Data3 supplied from the TCP processing unit 36, and provides the TCP-O header (that is, Seq3) removed by the header removal unit 34 to the packet (that is, Data3) from which the header (that is Seq12) has been removed.

Thereafter, the header conversion unit 38 transmits the TCP-O packet of Seq3+Data3 obtained by the header conversion process, to the terminal 70 (step S216 and step S141).

As described above, according to this embodiment, in the femto GW 30 serving as the relaying apparatus, the header removal units 34 and 35, the header conversion units 38 and 39, and the header replacement unit 42, which serve as the management unit, manage the correspondence relationships between the intra-flow numbers in the TCP flow and the intra-link numbers assigned by the TCP processing units 36 and 37 with respect to the TCP-O packets that have been distributed to the plurality of communication links by the distribution unit 33. The management unit replaces a first reception acknowledgement response, which has been transmitted from the apparatus on the reception side (the terminal 70 in this embodiment) according to the intra-flow numbers of the TCP-O packets transferred through the plurality of links, with second reception acknowledgement responses based on the intra-link numbers, in accordance with the correspondence relationships described above.

Each of the header removal units 34 and 35 removes the TCP-O header of a TCP-O packet distributed by the distribution unit 33 and inputs the packet from which the TCP-O header has been removed, to one of the TCP processing units 36 and 37 corresponding to a distribution destination link that is a communication link to which the TCP-O packet has been distributed. Each of the header conversion units 38 and 39 obtains a packet to which the intra-link number is assigned by one of the TCP processing units 36 and 37 corresponding to the distribution destination link. Each of the header conversion units 38 and 39 removes the intra-link number from the obtained packet, and transfers the TCP-O packet provided with the TCP-O header, which has been removed by the header removal units 34 or 35, to the apparatus on the reception side. Then each of the header conversion units 38 and 39 generates the correspondence relationship described above of the transferred TCP-O packet. The header replacement unit 42 replaces the first reception acknowledgement response based on the intra-flow numbers of the TCP-O packets transferred from the header conversion units 38 or 39, with the second reception acknowledgement responses in accordance with the correspondence relationships described above and distributes the second reception acknowledgement responses to the TCP processing units 36 and 37.

With this configuration of the femto GW 30, TCP-O packets supplied from the apparatus on the transmission side (the server 10 here) may be transferred to the terminal 70 through the plurality of communication links without changing forms of the TCP-O packets. As a result, since the terminal 70 is able to receive the TCP-O packets via the TCP-O connection between the server 10 and the terminal 70, the link aggregation may be realized without adding the replacement function described above to the terminal 70.

Furthermore, with this configuration of the femto GW 30, the first reception acknowledgement response transmitted from the apparatus on the reception side (the terminal 70 here) may be replaced with the second reception acknowledgement response for each communication link. This allows retransmission control, transmission rate control, and the like to be performed for each communication link.

Furthermore, the first reception acknowledgement response includes a first ACK number and a first SACK number, and the second reception acknowledgement response includes a second ACK number and a second SACK number which are obtained as a result of the header replacement unit 42 replacing the first ACK number and the first SACK number with the second ACK number and the second SACK, respectively.

By this, the retransmission control and the transmission rate control may be reliably performed for each communication link.

Furthermore, the first reception acknowledgement response includes the reception window value of the terminal 70, and the header replacement unit 42 adds the reception window value to the second reception acknowledgement responses.

This allows retransmission control and transmission rate control to be performed taking a state of a processing load of the terminal 70 into consideration.

In the femto GW 30 serving as the relaying apparatus, the transparent TCP proxy 32 replaces a value of a maximum segment size included in a control packet transmitted in a procedure for establishing a TCP-O connection, that is, three-way handshake, with a value of a smallest one of maximum segment sizes of a plurality of communication links used in the LA.

With this configuration of the femto GW 30, a division process to be performed on the TCP-O packet may be avoided. That is, a processing load of the femto GW 30 may be reduced.

Second Embodiment

In a second embodiment, a header conversion unit is configured to perform both of removal of a header and generation of the corresponding relationship.

Example of Configuration of Relaying Apparatus

Figure 16:
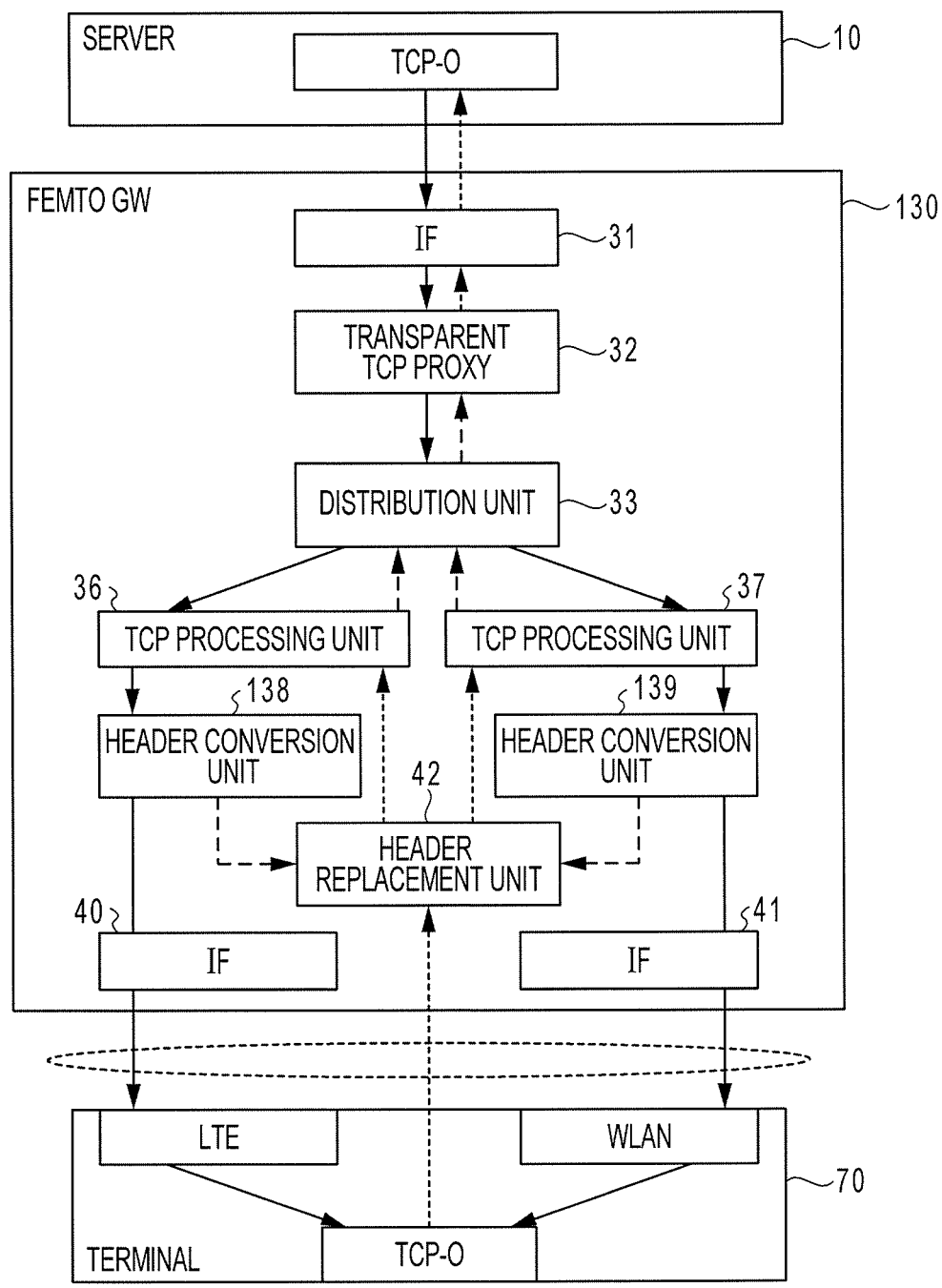
FIG. 16 is a diagram illustrating an example of a femto GW serving as a relay apparatus, according to a second embodiment.

FIG. 16 is a diagram illustrating an example of a femto GW serving as a relay apparatus, according to a second embodiment. In FIG. 16, in addition to the femto GW 130, a server 10 and a terminal 70 are also illustrated for convenience sake. A femto base station 50 and a wireless LAN access point 60 are omitted in FIG. 16.

In FIG. 16, the femto GW 130 includes header conversion units 138 and 139.

The femto GW 130 does not include the header removal units 34 and 35 which are included in the femto GW 30 of the first embodiment. Accordingly, TCP-O packets distributed to a plurality of communication links are input to TCP processing units 36 and 37.

The TCP processing unit 36 assigns an intra-link number (that is, a first intra-link number) in an LTE link to a packet supplied from an distribution unit 33 and outputs the packet provided with the assigned first intra-link number as a TCP-D1 header to a header conversion unit 138.

Similarly, the TCP processing unit 37 assigns an intra-link number (that is, a second intra-link number) in a wireless LAN link to a packet supplied from the distribution unit 33 and outputs the packet provided with the assigned second intra-link number as a TCP-D2 header to a header conversion unit 139.

The header conversion unit 138 removes the TCP-D1 header of the TCP-D1 packet supplied from the TCP processing unit 36, and transfers a resultant TCP-O packet to the terminal 70 serving as an apparatus on a reception side. Furthermore, the header conversion unit 138 generates the correspondence relationship between an intra-flow number and an intra-link number for each transferred TCP-O packet and outputs the generated correspondence relationship to a header replacement unit 42.

The header conversion unit 139 removes the TCP-D2 header of the TCP-D2 packet received from the TCP processing unit 37 and transfers a resultant TCP-O packet to the terminal 70 serving as the apparatus on the reception side. Furthermore, the header conversion unit 139 generates the correspondence relationship between an intra-flow number and an intra-link number for each transferred TCP-O packet and outputs the generated correspondence relationship to the header replacement unit 42.

Example of Operation of Relaying Apparatus

Figure 17:
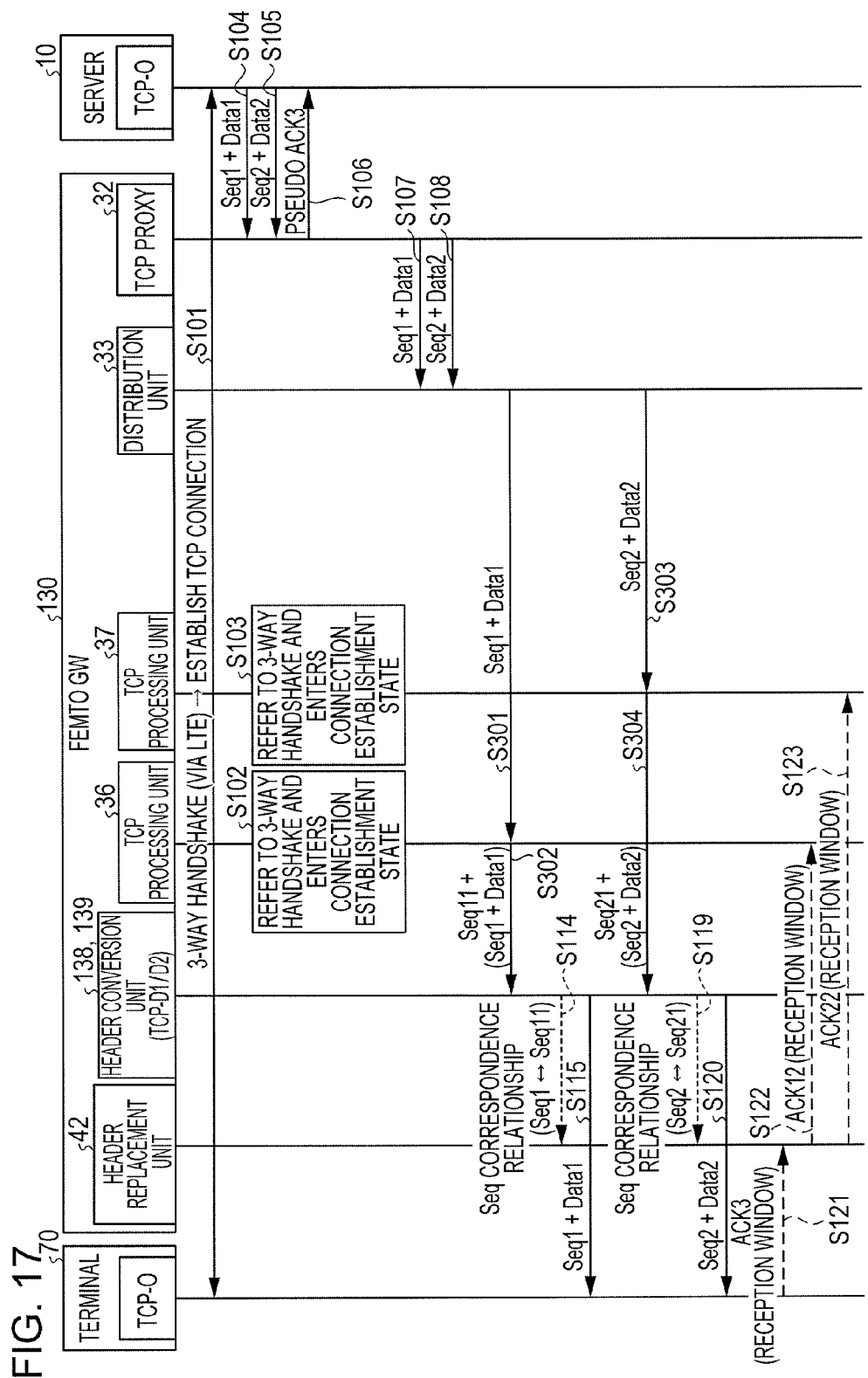
FIG. 17 is a diagram illustrating an example of an operational sequence for a communication system including a femto GW serving as a relaying apparatus, according to a second embodiment.
Figure 18:
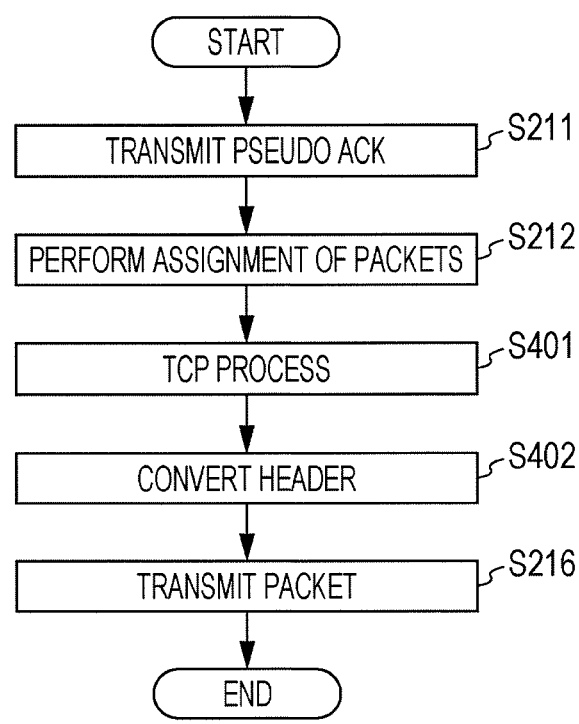
FIG. 18 is a diagram illustrating an example of an operational flowchart for a femto GW, according to a second embodiment.

An example of a processing operation of the relaying apparatus having the configuration described above will be described. FIG. 17 is a diagram illustrating an example of an operational sequence for a communication system including a femto GW serving as a relaying apparatus, according to a second embodiment. FIG. 18 is a diagram illustrating an example of an operational flowchart for a femto GW, according to a second embodiment. A process of the three-way handshake, a process of changing a reception acknowledgement response, and so on of the second embodiment are the same as those of the first embodiment. Specifically, a processing operation of the femto GW 130 in a process of transferring a data packet is different from that of the first embodiment.

The distribution unit 33 distributes TCP-O packets supplied from a TCP proxy 32 to the LTE link and the wireless LAN link (step S212). In this embodiment, a TCP-O packet of Seq1+Data1 is distributed to the LTE link, and a TCP-O packet of Seq2+Data2 is distributed to the wireless LAN link. Therefore, the TCP-O packet of Seq1+Data1 is output to the TCP processing unit 36 (step S301), and the TCP-O packet of Seq2+Data2 is output to the TCP processing unit 37 (step S303).

Then the TCP processing unit 36 executes a TCP process (step S401). The TCP process here includes a process of assigning a first intra-link number to a TCP-O packet supplied from the distribution unit 33 and a process of providing the TCP-O packet with the first intra-link number as a TCP-D1 header. Thereafter, the TCP processing unit 36 outputs the TCP-D1 packet of Seq11+(Seq1+Data1) provided with a first intra-link number of Seq11 as a TCP-D1 header of the packet TCP-O packet of Seq1+Data1, to the header conversion unit 138 (step S302).

The TCP processing unit 37 executes a TCP process (step S401). The TCP process here includes a process of assigning a second intra-link number to a TCP-O packet supplied from the distribution unit 33, and a process of providing the TCP-O packet with the second intra-link number as a TCP-D2 header. Thereafter, the TCP processing unit 37 outputs a TCP-D1 packet of Seq21+(Seq2+Data2) provided with a second intra-link number of Seq21 as a TCP-D2 header of the packet TCP-O of packet Seq2+Data2, to the header conversion unit 139 (step S304).

The header conversion unit 138 executes a process of converting the header of the packet supplied from the TCP processing unit 36 (step S402). Specifically, the header conversion unit 138 removes the TCP-D1 header (that is, Seq11) from the TCP-D1 packet of Seq11+(Seq1+Data1) supplied from the TCP processing unit 36. The header conversion unit 138 transmits the TCP-O packet of Seq1+Data1 obtained by the header conversion process, to the terminal 70 (step S216 and step S115).

Meanwhile, the header conversion unit 138 generates the correspondence relationship between an intra-flow number and the intra-link number of the transferred TCP-O packet of Seq1+Data1, and outputs the generated correspondence relationship to the header replacement unit 42 (step S114). Specifically, the correspondence relationship between Seq1 and Seq11 is output. The header replacement unit 42 stores this correspondence relationship in a correspondence relationship table.

The header conversion unit 139 executes a process of converting the header of the packet supplied from the TCP processing unit 37 (step S402). Specifically, the header conversion unit 139 removes the TCP-D1 header (that is, Seq21) from the TCP-D1 packet of Seq21+(Seq2+Data2) supplied from the TCP processing unit 37. Thereafter, the header conversion unit 139 transmits the TCP-O packet of Seq2+Data2 obtained by the header conversion process, to the terminal 70 (step S216 and step S120).

Furthermore, the header conversion unit 139 generates the correspondence relationship between an intra-flow number and the intra-link number of the transferred TCP-O packet of Seq2+Data2, and outputs the generated correspondence relationship to the header replacement unit 42 (step S119). Specifically, the correspondence relationship between Seq2 and Seq21 is output.

As described above, according to this embodiment, the header conversion units 138 and 139 function as a management unit in the femto GW 130 serving as the relaying apparatus. With the configuration of the femto GW 130, the same effect as the first embodiment is obtained.

Third Embodiment

A third embodiment relates to variation of retransmission control of TCP processing units and variation of a process performed by a header replacement unit. Specifically, in the first and second embodiments, the TCP processing units 36 and 37 determine that, when the second reception acknowledgement response is not received in a predetermined period of time after a previous packet is transmitted, packet loss of the packet occurs, and execute retransmission control. On the other hand, in the third embodiment, when ACK of second reception acknowledgement response representing the same intra-link number is received N times (N is a natural number equal to or larger than 2), a TCP processing unit executes retransmission control of a packet corresponding to the same intra-link number. Note that a basic configuration of a femto GW of the third embodiment may be the same as that of the femto GW 30 of the first embodiment or that of the femto GW 130 of the second embodiment. Therefore, as an example, a case where the basic configuration of the femto GW of the third embodiment is the same as that of the femto GW 30 of the first embodiment will be described with reference to FIG. 8.

Figure 19:
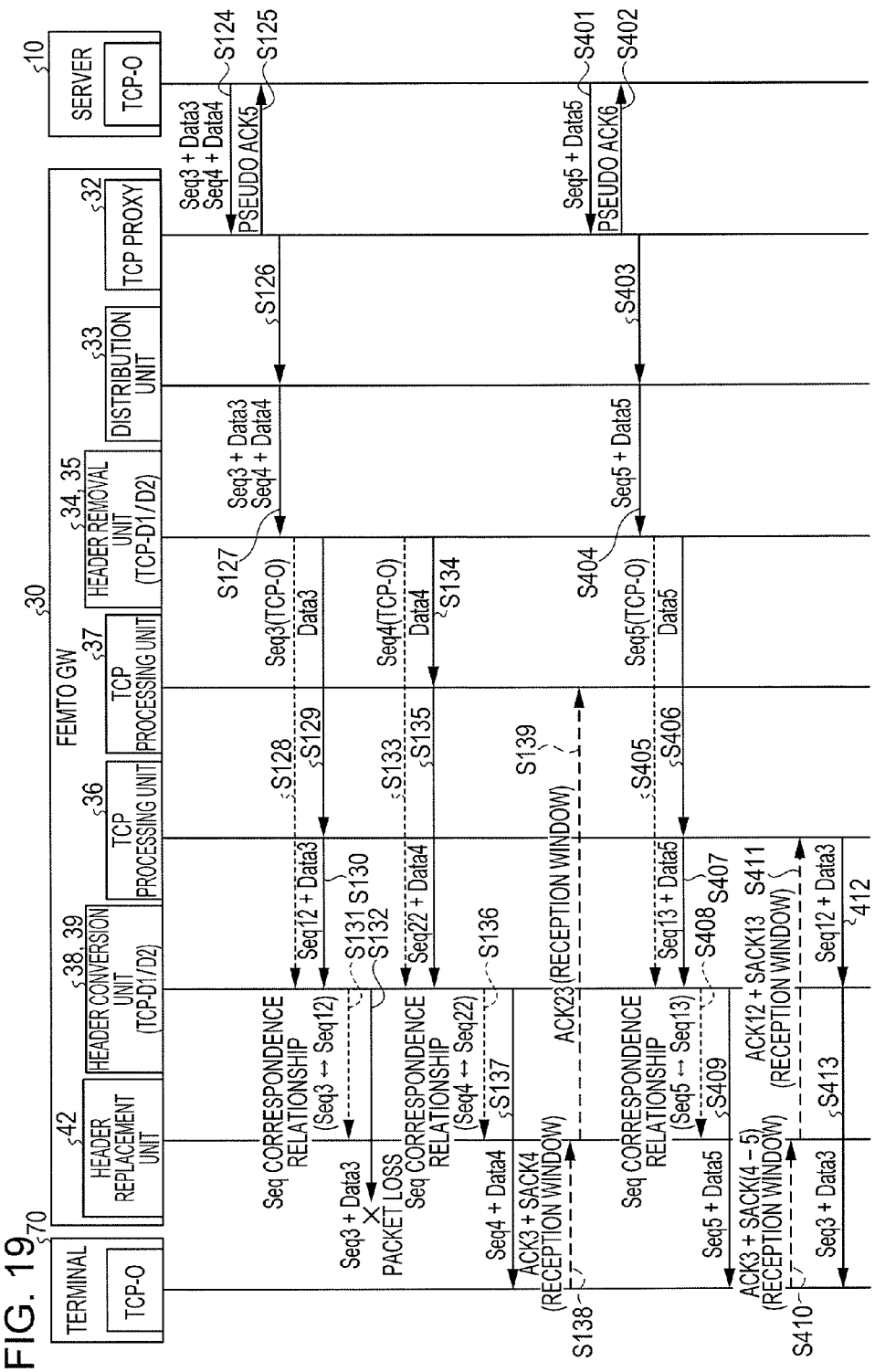
FIG. 19 is a diagram illustrating an example of an operational sequence for a communication system including a femto GW serving as a relaying apparatus, according to a third embodiment.

FIG. 19 is a diagram illustrating an example of an operational sequence for a communication system including a femto GW serving as a relaying apparatus, according to a third embodiment.

A TCP-O of a server 10 transmits a TCP-O packet of Seq5+Data5 to a terminal 70 (step S401).

In a femto GW 30, a TCP proxy 32 transmits pseudo ACK6 to the server 10 (step S402).

The TCP proxy 32 outputs the received TCP-O packet of Seq5+Data5 to a distribution unit 33 (step S403).

The distribution unit 33 distributes the received TCP-O packet of Seq5+Data5 to an LTE link, and outputs the TCP-O packet of Seq5+Data5 to a header removal unit 34 (step S404).

The header removal unit 34 removes a TCP-O header (that is, Seq5) from the TCP-O packet of Seq5+Data5 supplied from the distribution unit 33, and outputs the removed TCP-O header to a header conversion unit 38 (step S405). Furthermore, the header removal unit 34 outputs the packet (that is, Data 5) from which the TCP-O header (that is, Seq5) has been removed, to a TCP processing unit 36 (step S406).

The TCP processing unit 36 outputs a packet of Seq13+Data5 provided with a first intra-link number of Seq13 as a header of the packet Data5, to the header conversion unit 38 (step S407).

The header conversion unit 38 removes the header (that is, Seq13) from the packet of Seq13+Data5 supplied from the TCP processing unit 36, and provides the packet (that is, Data5) from which the header (that is Seq13) has been removed, with the TCP-O header (that is, Seq5) removed by the header removal unit 34.

The header conversion unit 38 transmits a TCP-O packet of Seq5+Data5 obtained by the header conversion process, to the terminal 70 (step S409).

Furthermore, the header conversion unit 38 generates the correspondence relationship between an intra-flow number and the intra-link number of the transferred TCP-O packet of Seq5+Data5, and outputs the generated correspondence relationship to a header replacement unit 42 (step S408). Specifically, the correspondence relationship between Seq5 and Seq13 is output.

Upon receiving the TCP-O packet of Seq5+Data5, a TCP-O of the terminal 70 transmits a first reception acknowledge response (ACK3+SACK(4-5) here) to the femto GW 30 (step S410). Here, ACK3+SACK(4-5) represents that packets having Seq numbers equal to or smaller than 2 have been received, a packet having a Seq number of 3 has not been received, and packets having Seq numbers 4 and 5 have been received.

The header replacement unit 42 of the femto GW 30 replaces the received first reception acknowledgement response with a reception acknowledgement response based on the intra-link number (that is, a second reception acknowledgement response described above) in accordance with the stored correspondence relationship, when the femto GW 30 receives the first reception acknowledgement response. Upon receiving the first reception acknowledgement response (ACK3+SACK(4-5) here), the header replacement unit 42 replaces the received first reception acknowledgement response with a reception acknowledgement response based on the intra-link number (that is, the second reception acknowledgement response) in accordance with the stored correspondence relationship. ACK3 represents that all TCP-O packets having intra-flow numbers not greater than 2 have been received. SACK(4-5) represents that intra-flow numbers of TCP-O packets which have been received in a state where a TCP-O packet having an intra-flow number 3 is not received yet, is 4 and 5. Accordingly, the header replacement unit 42 generates a second reception acknowledgement response of ACK12+SACK13 representing that a packet having an intra-link number 12 corresponding to an intra-flow number 3 in the correspondence relationship table has not been received yet and a packet having an intra-link number 13 corresponding to an intra-flow number 5 has been received, and outputs the second reception acknowledgement response of ACK12+SACK13 to the TCP processing unit 36 (step S411).

Figure 20:
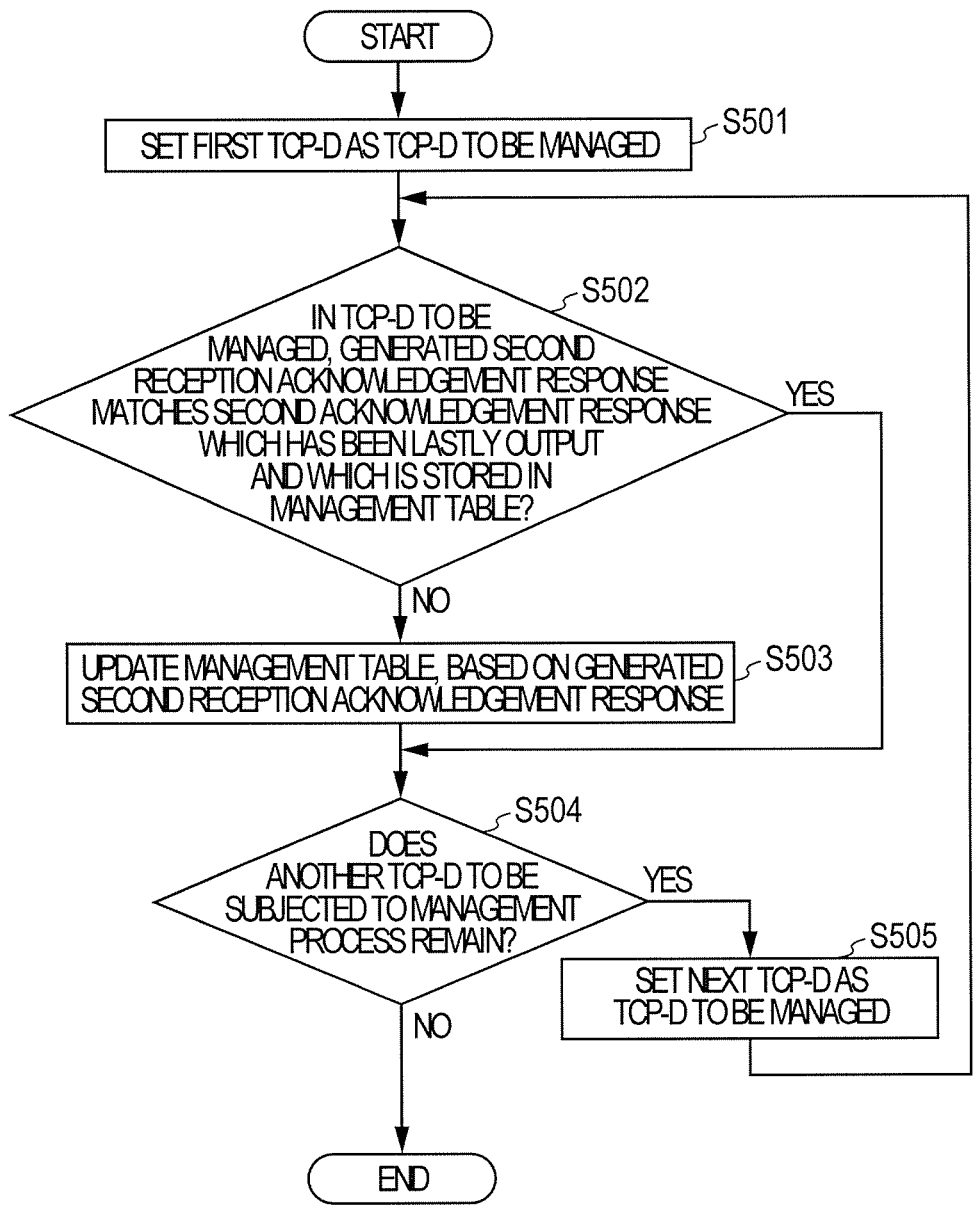
FIG. 20 is a diagram illustrating an example of an operational flowchart for managing a second reception acknowledgement response which has been output, according to a third embodiment.

Here, the header replacement unit 42 manages the second reception acknowledgement responses that have been finally output to the TCP processing units 36 and 37. FIG. 20 is a diagram illustrating an example of an operational flowchart for managing a second reception acknowledgement response which has been output, according to a third embodiment. An operational flowchart of FIG. 20 may be executed every time the replacement process is performed by the header replacement unit 42.

The header replacement unit 42 sets a first one of TCP-Ds (that is, TCP connections in a plurality of communication links) as a target of a management process (step S501).

The header replacement unit 42 determines whether a generated second reception acknowledgement response of the TCP-D as the target of the management process coincides with a second reception acknowledgement response which is stored in a management table and has been lastly output (step S502).

When the generated second reception acknowledgement response does not coincide with the second reception acknowledgement response which has been lastly output (No in step S502), the header replacement unit 42 updates the management table, based on the generated second reception acknowledgement response (step S503), and outputs the generated second reception acknowledgement response to a TCP processing unit corresponding to the TCP-D set as the management target. On the other hand, when the generated second reception acknowledgement response coincides with the second reception acknowledgement response which has been lastly output (Yes in step S502), the process proceeds to step S504. Here, in the TCP-D set as the management target, when the generated second reception acknowledgement response coincides with the second reception acknowledgement response which has been lastly output and which is stored in the management table (Yes in step S502), the header replacement unit 42 does not output the generated second reception acknowledgement response to the TCP processing unit corresponding to the TCP-D of the management target. This prevents retransmission from being mistakenly performed.

The header replacement unit 42 determines whether another TCP-D which has not been set as the target of the management process remains (step S504).

When another TCP-D which has not been set as the target of the management process remains (Yes in step S504), the header replacement unit 42 sets a next TCP-D as a TCP-D of the target of the management process (step S505). Then the processing flow returns to step S502. On the other hand, when another TCP-D which has not been set as the target of the management process does not remain (No in step S504), the processing flow of FIG. 20 is terminated.

Figures 21, 22:
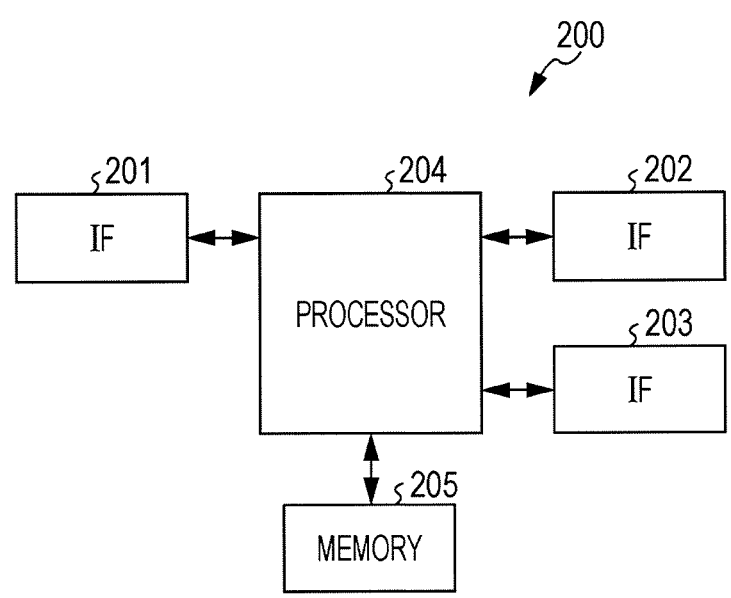
FIG. 21 is a diagram illustrating an example of a management table for managing second reception acknowledgement responses which have been output, according to a third embodiment.
FIG. 22 is a diagram illustrating an example of a hardware configuration of a femto GW serving as a relaying apparatus, according to an embodiment.

FIG. 21 is a diagram illustrating an example of a management table for managing second reception acknowledgement responses which have been output, according to a third embodiment. In FIG. 21, a state of the management table at a time when the process in step S139 of FIG. 19 is terminated is illustrated. Specifically, according to the management table in FIG. 21, a second reception acknowledgement response which has been lastly output to the TCP processing unit 36 is ACK12, and a second reception acknowledgement response which has been lastly output to the TCP processing unit 37 is ACK23. Therefore, upon receiving the first reception acknowledgement response of ACK3+SACK(4-5) transmitted in step S410 of FIG. 19, the header replacement unit 42 generates ACK23 as a second reception acknowledgement response to the TCP processing unit 37. However, since ACK23 is stored in the management table as the second reception acknowledgement response to the TCP processing unit 37, the header replacement unit 42 does not output ACK23 to the TCP processing unit 37.

Referring back to FIG. 19, upon receiving a second reception acknowledgement response of ACK12+SACK13 output from the header replacement unit 42 in step S411, the TCP processing unit 36 increments a counter indicating the number of times an ACK included in a second reception acknowledgement response is received where the ACK has an intra-link number of 12 being the same as that contained in the received second reception acknowledgement response, and determines whether the value of the counter has reached N. When it is determined that the value of the counter has reached N, the TCP processing unit 36 outputs a packet of Seq12+Data3 to the header conversion unit 38 as retransmission (step S412). In the case, since N is equal to 2, the TCP processing unit 36 outputs the packet of Seq12+Data3 to the header conversion unit 38. On the other hand, when it is determined that the value of the counter has not reached N, the TCP processing unit 36 waits for receiving a next second reception acknowledgement response.

The header conversion unit 38 removes a header (that is, Seq12) from the packet of Seq12+Data3 supplied from the TCP processing unit 36, and provides the packet (that is, Data3) from which the header (that is, Seq12) has been removed, with the TCP-O header (that is, Seq3) removed by the header removal unit 34.

Thereafter, the header conversion unit 38 transmits the TCP-O packet of Seq3+Data3 obtained by the header conversion process, to the terminal 70 (step S413).

As described above, according to this embodiment, in the femto GW 30 serving as a relaying apparatus, when consecutively receiving second reception acknowledgement responses including the same ACK from the header replacement unit 42 N times, each of the TCP processing units 36 and 37 transmits a TCP packet corresponding to the same ACK number again.

Also with this configuration of the femto GW 30, retransmission control and transmission rate control may be reliably performed for each communication link.

Furthermore, when a second reception acknowledgement response, which includes a second ACK number obtained by replacing a first ACK number of a first reception acknowledgement response and a second SACK number obtained by replacing a first SACK number of the first reception acknowledgement response, has not been distributed, the header replacement unit 42 distributes the second reception acknowledgement response, and otherwise the header replacement unit 42 does not distribute the second reception acknowledgement response.

This configuration of the femto GW 30 prevent retransmission from being mistakenly performed.

Other Embodiments

It is not necessarily the case that the components of the units illustrated in the first and second embodiments are physically configured as illustrated. Specifically, concrete forms of distribution and integration of the units are not limited to those illustrated, and all or some of the units may be functionally or physically distributed or integrated in an arbitrary unit depending on various loads and various use states.

Furthermore, all or some of the various processing functions performed by the devices may be executed by a central processing unit (CPU) (or a microcomputer such as a micro processing unit (MPU) or a micro controller unit (MCU)). Furthermore, all or arbitrary some of the various processing functions may be executed on programs which are analyzed and executed by the CPU (or a microcomputer such as an MPU or an MCU) or hardware of a wired logic.

The femto GW serving as a relaying apparatus according to the first and second embodiments may be realized by a hardware configuration described below.

FIG. 22 is a diagram illustrating an example of a hardware configuration of a femto GW serving as a relaying apparatus, according to an embodiment. As illustrated in FIG. 22, a femto GW 200 includes interfaces (IFs) 201, 202, and 203, a processor 204, and a memory 205. Examples of the processor 204 include a CPU, a digital signal processor (DSP), and a field programmable gate array (FPGA). Examples of the memory 205 include a random access memory (RAM) such as a synchronous dynamic random access memory (SDRAM), a read only memory (ROM), and a flash memory.

The various processing functions of the femto GWs of the first and second embodiments may be realized when a processor included in a management apparatus executes programs stored in various memories such as a nonvolatile storage medium.

Specifically, programs corresponding to the processes executed by the transparent TCP proxy 32, the distribution unit 33, the header removal units 34 and 35, the TCP processing units 36 and 37, the header conversion units 38, 39, 138, and 139, and the header replacement unit 42 may be recorded in the memory 205 and executed by the processor 204. Furthermore, the IFs 31, 40, and 41 are realized by the IFs 201, 202, and 203, respectively.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus to perform link aggregation in which a transmission control protocol (TCP) flow is transferred by distributing the TCP flow to a plurality of links, the apparatus comprising:
   a plurality of first processors each corresponding to a different one of the plurality of links and configured to provide each of TCP packets distributed to each link with an intra-link number; and
   a second processor configured to:
   distribute TCP packets transmitted from a first apparatus on a transmission side to the plurality of links;
   manage, for each of TCP packets distributed to each of the plurality of links, correspondence relationships between intra-flow numbers in each TCP flow and the intra-link numbers of the TCP packets distributed to each link;
   perform a header conversion process including:
      obtaining a TCP packet provided with an intra-link number by a first processor corresponding to a distribution destination link,
      removing the provided intra-link number from the obtained TCP packet,
      transferring the TCP packet to a second apparatus on a reception side, and
      generating a correspondence relationship regarding the transferred TCP packet;
   replace a first reception acknowledgement response that is transmitted from the second apparatus on the reception side according to the intra-flow numbers of the TCP packets through each of the plurality of links, with a second reception acknowledgement response to be transmitted according to the intra-link numbers, in accordance with the correspondence relationships; and
   distribute the second reception acknowledgement response to the plurality of first processors.

2. The apparatus of claim 1, wherein the second processor is further configured to perform:
   a header removal process including:
      removing the TCP header from the TCP packet distributed to the distribution destination link that is one of the plurality of links to which the TCP packet is distributed, and inputting the TCP packet from which the TCP header has been removed to a TCP processing unit corresponding to the distribution destination link;
   the header conversion process further including:
      removing the provided intra-link number from the obtained TCP packet, transferring the TCP packet provided with the TCP header that has been removed from the TCP packet by the header removal process, to the second apparatus on the reception side; and
   a header replacement process including:
      replacing the first reception acknowledgement response transmitted from the second apparatus according to the intra-flow numbers of the TCP packets transferred by the header conversion process, with the second reception acknowledgement response in accordance with the correspondence relationships generated by the header conversion process, and
      distributing the second reception acknowledgement response to the plurality of first processors.

3. The apparatus of claim 1, wherein the second processor is further configured to perform:
   the header conversion process further including:
      removing the provided intra-link number from the obtained TCP packet, and transferring the TCP packet from which the intra-link number has been removed, to the second apparatus on the reception side; and
   a header replacement process including:
      replacing the first reception acknowledgement response that is transmitted from the second apparatus according to the intra-flow numbers of the TCP packets transferred by the header conversion process, with the second reception acknowledgement response in accordance with the correspondence relationships generated by the header conversion process, and
      distributing the second reception acknowledgement response to the plurality of first processors.

4. The apparatus of claim 1, wherein:
   the first reception acknowledgement response includes a first acknowledgement (ACK) number and a first selective ACK (SACK) number; and
   the second reception acknowledgement response includes a second ACK number and a second SACK number with which the management unit has replaced the first ACK number and the first SACK number, respectively.

5. The apparatus of claim 4, wherein when consecutively receiving the second reception acknowledgement response including a same second ACK number a plurality of times, each of the plurality of first processors retransmits the TCP packet corresponding to the same second ACK number.

6. The apparatus of claim 4, wherein when the second reception acknowledgement response including the second ACK number and the second SACK number with which the first ACK number and the first SACK number are replaced, respectively, has not been distributed to the plurality of first processors, the management unit distributes the second reception acknowledgement response to the plurality of first processors, and otherwise the management unit does not distribute the second reception acknowledgement response to the plurality of first processors.

7. The apparatus of claim 1, wherein:
   the first reception acknowledgement response includes a reception window value; and
   the management unit adds the reception window value to the second reception acknowledgement responses.

8. The apparatus of claim 1, wherein a value of a maximum segment size included in a control message which is transmitted when a TCP flow is established between the first apparatus on the transmission side and the second apparatus on the reception side of the TCP flow is replaced with a smallest one of values of maximum segment sizes of the plurality of links.

9. A method for performing link aggregation in which a transmission control protocol (TCP) flow is transferred by distributing the TCP flow to a plurality of links, the method comprising:
   distributing TCP packets transmitted from a first apparatus on a transmission side to the plurality of links;
   providing each of TCP packets distributed to each link with an intra-link number;
   managing, for each of TCP packets distributed to each of the plurality of links, correspondence relationships between intra-flow numbers in each TCP flow and the intra-link numbers of the TCP packets distributed to the each link;
   performing a header conversion process including:
   obtaining a TCP packet provided with the intra-link number,
   removing the provided intra-link number from the obtained TCP packet, transferring the TCP packet to a second apparatus on a reception side, and generating the correspondence relationship regarding the transferred TCP packets; and replacing a first reception acknowledgement response that is transmitted from the second apparatus on the reception side according to the intra-flow numbers of the TCP packets through each of the plurality of links, with a second reception acknowledgement response to be transmitted according to the intra-link numbers, in accordance with the correspondence relationships.

10. A non-transitory, computer-readable recording medium having stored therein a program for causing a computer included in an apparatus performing link aggregation in which a transmission control protocol (TCP) flow is transferred by distributing the TCP flow to a plurality of links, to execute a process comprising:

distributing transmission control protocol (TCP) packets transmitted from a first apparatus on a transmission side to the plurality of links;

providing each of TCP packets distributed to the each link with an intra-link number;

managing, for each of TCP packets distributed to each of the plurality of links, correspondence relationships between intra-flow numbers in each TCP flow and the intra-link numbers of the TCP packets distributed to the each link;

performing a header conversion process including:

obtaining a TCP packet provided with the intra-link number, removing the provided intra-link number from the obtained TCP packet, transferring the TCP packet to a second apparatus on a reception side, and generating the correspondence relationship regarding the transferred TCP packets; and replacing a first reception acknowledgement response that is transmitted from the second apparatus on the reception side according to the intra-flow numbers of the TCP packets through each of the plurality of links, with a second reception acknowledgement response to be transmitted according to the intra-link numbers, in accordance with the correspondence relationships.

\* \* \* \* \*